(12) United States Patent
Yasukawa

(10) Patent No.: US 9,105,274 B2
(45) Date of Patent: Aug. 11, 2015

(54) OPTICAL DISC INSPECTION METHOD IN OPTICAL DISC LIBRARY APPARATUS AND OPTICAL DISC LIBRARY APPARATUS

(71) Applicant: Hitachi-LG Data Storage, Inc., Tokyo (JP)

(72) Inventor: Takakiyo Yasukawa, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 14/189,082

(22) Filed: Feb. 25, 2014

(65) Prior Publication Data

US 2014/0293764 A1    Oct. 2, 2014

(30) Foreign Application Priority Data

Mar. 27, 2013    (JP) .................................. 2013-065405

(51) Int. Cl.
*G11B 7/0045* (2006.01)
*G11B 20/18* (2006.01)
*G11B 19/04* (2006.01)

(52) U.S. Cl.
CPC .......... *G11B 7/00458* (2013.01); *G11B 19/046* (2013.01); *G11B 20/1816* (2013.01); *G11B 2020/1869* (2013.01)

(58) Field of Classification Search
None
See application file for complete search history.

(56) References Cited

U.S. PATENT DOCUMENTS

| | | | | |
|---|---|---|---|---|
| 5,351,156 A | * | 9/1994 | Gregory et al. | 360/74.1 |
| 7,286,458 B2 | * | 10/2007 | Wilhelmsson | 369/53.1 |
| 7,376,066 B2 | * | 5/2008 | Sakagami | 369/59.25 |
| 7,593,176 B2 | * | 9/2009 | Yoshida et al. | 360/31 |
| 8,009,537 B2 | * | 8/2011 | Kubo et al. | 369/53.12 |
| 8,184,516 B2 | * | 5/2012 | Kimmelmann et al. | 369/53.44 |
| 8,406,104 B1 | * | 3/2013 | Himi et al. | 369/53.2 |
| 2007/0086301 A1 | * | 4/2007 | Yamakawa | 369/59.22 |
| 2012/0063290 A1 | * | 3/2012 | Takazawa et al. | 369/124.01 |
| 2013/0107690 A1 | * | 5/2013 | Neo | 369/53.2 |
| 2014/0211600 A1 | * | 7/2014 | Okamoto et al. | 369/47.15 |
| 2014/0211601 A1 | * | 7/2014 | Morimoto et al. | 369/53.22 |

FOREIGN PATENT DOCUMENTS

| | | | | | |
|---|---|---|---|---|---|
| JP | 07225777 A | * | 8/1995 | ............. | G06F 17/40 |
| JP | 2008-204580 A | | 9/2008 | | |
| JP | 2008204580 A | * | 9/2008 | | |

* cited by examiner

*Primary Examiner* — Brenda Bernardi
(74) *Attorney, Agent, or Firm* — Baker Botts L.L.P.

(57) ABSTRACT

An optical disc library apparatus, on which plural optical discs and plural optical drives are mounted, has the ability to reduce the degradation of recording/reproduction capability owing to the variation of temperature. In the optical disc library apparatus, causes for the quality degradation of the optical discs are analyzed; temperature inside the optical disc library apparatus is measured in order to make recoveries in accordance with the causes; an inspection cycle for inspecting the optical discs is determined on the basis of the measured temperature; and the inspection of recording qualities of optical discs on which data have already been recorded and that are stored in the optical disc library apparatus is performed by the optical drives on the basis of the measured temperature.

24 Claims, 20 Drawing Sheets

FIG.5

| TEMPERATURE | INSPECTION CYCLE |
|---|---|
| 30°C OR LOWER | FIVE YEARS |
| 30°C TO 35°C | THREE YEARS |
| 35°C TO 40°C | TWO YEARS |
| 40°C TO 45°C | ONE YEAR |
| 45°C TO 50°C | HALF YEAR |
| 50°C OR HIGHER | ONE FIFTH YEAR |

FIG.13

| ADDRESS | AF0000h | B00000h | B10000h | B20000h | B30000h | B40000h | B50000h | B60000h |
|---|---|---|---|---|---|---|---|---|
| RECORDING CONDITION | ... | Write Power 90% | Write Power 95% | Write Power 100% | Write Power 105% | Write Power 110% | ... | |

OPTICAL DISC INSPECTION METHOD IN OPTICAL DISC LIBRARY APPARATUS AND OPTICAL DISC LIBRARY APPARATUS

CROSS-REFERENCE TO RELATED APPLICATION

This application claims the Japanese Patent Application No. 2013-065405 filed Mar. 27, 2013, which is incorporated herein by reference in its entirety.

BACKGROUND

The present invention relates to an optical disc inspection method used in an optical disc library apparatus on which plural disc devices are mounted.

One of background technologies regarding the present invention is a technology described, for example, in Japanese Unexamined Patent Application Publication No. 2008-204580. The outline of a technology disclosed in this patent application publication is described in such a way that an optical disc management device measures the recording quality of an optical disc to create disc management information and measurement history information, and the next timing of the recording quality measurement is determined on the basis of these disc management information and measurement history information. When the determined measurement timing comes, the optical disc management device measures the recording quality of the optical disc again.

SUMMARY

The above patent application publication describes technology in which the timing of the measurement of an optical disc is determined on the basis of degradation degree shown by the measurement result of the recording quality of an optical disc. In the actual situation of the recording quality of an optical disc, there is a problem in that the degradation of the recording quality is incurred not only by aged degradation, but also by flaws and dust.

The present invention was achieved with the above-mentioned problem in mind, and the object of the present invention is to provide a method in which the causes of the quality degradation of an optical disc are searched for and appropriate pieces of recovery processing are taken in accordance with the causes.

In order to address the above-mentioned problem, the configurations described within the scope of the appended claims are used in the embodiments of the present invention.

According to the present invention, appropriate pieces of recovery processing can be taken in accordance with the causes of the quality degradation of an optical disc in an optical disc library apparatus.

BRIEF DESCRIPTION OF THE DRAWINGS

FIG. 5 is a diagram showing the relationship between environmental temperatures and inspection cycles;

FIG. 13 is a diagram schematically showing the recording regions of an optical disc according to a sixth embodiment;

DETAILED DESCRIPTION

Hereinafter, the embodiments of an optical disc library apparatus according to the present invention will be described with reference to the accompanying drawings.

First Embodiment

The configuration and operation of an optical disc library apparatus according to a first embodiment of the present invention will be described with reference to the accompanying drawings. Here, although a blue-ray disc is used as an optical disc in this embodiment, the optical disc to be used in this embodiment is not limited to a blue-ray disc. As an optical disc used in this embodiment, an optical disc using hologram or the like other than a blue-ray disc can be used. Alternatively, one of other removable media and a recording/reproducing device for the removable medium can be mounted on the optical disc library apparatus instead of a blue-ray disc.

Figure 2:
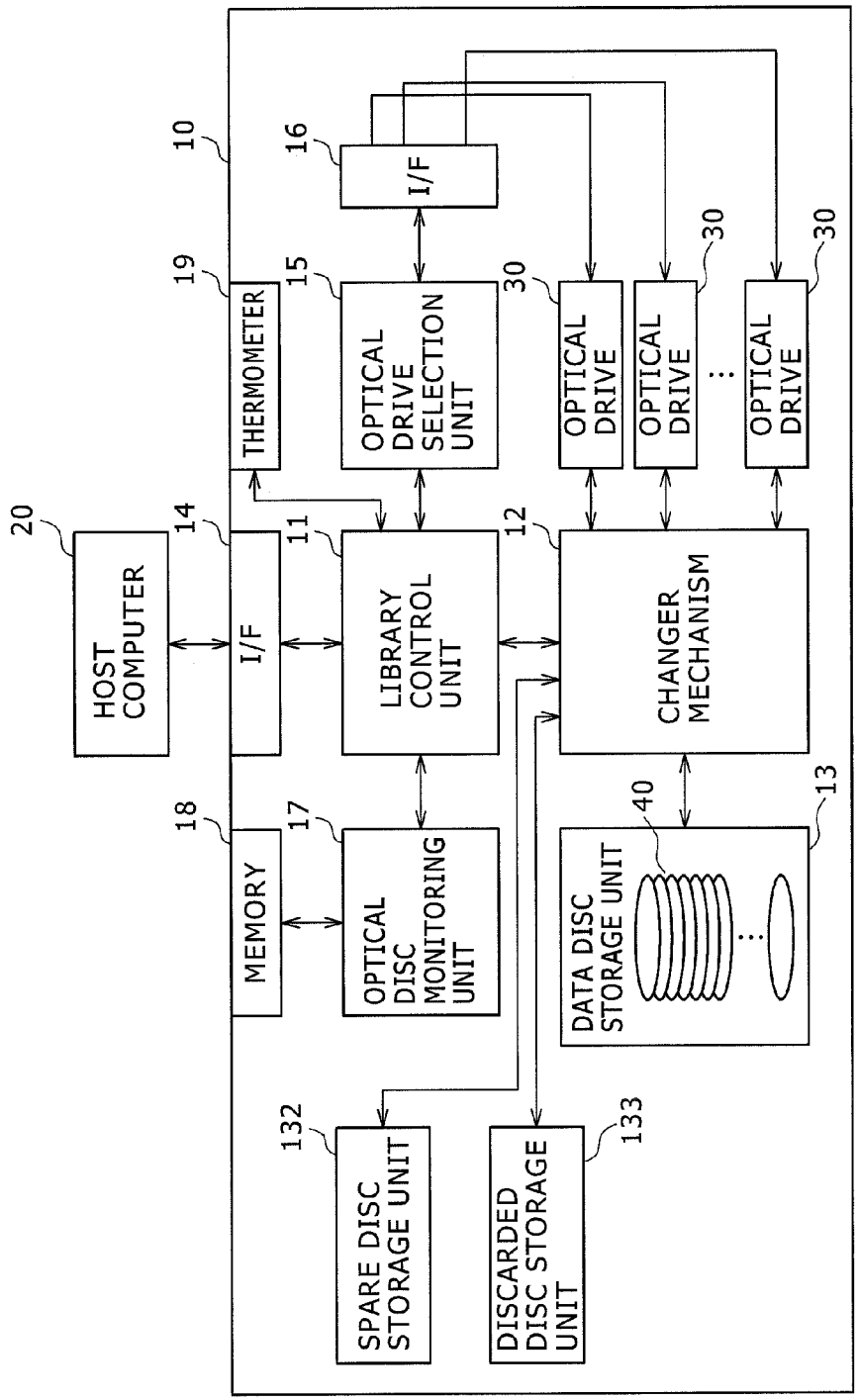
FIG. 2 is a block diagram of an optical disc library apparatus according to the first embodiment.

FIG. 2 is a block diagram of the optical disc library apparatus according to the first embodiment. The optical disc library apparatus 10 according to this embodiment includes: a library control unit 11; a changer mechanism 12; a data disc storage unit 13 for storing plural optical discs 40; a spare disc storage unit 132; a discarded disc storage unit 133; a host interface 14; an optical drive selection unit 15; a drive interface 16; an optical disc monitoring unit 17; a memory 18; a thermometer 19; and plural optical drives 30.

The optical disc library apparatus 10 is coupled to a host computer 20 via the host interface 14, receives various commands for recording and reproducing data and data to be recorded from the host computer 20, and transmits the results of executing the commands and reproduced data to the host computer 20.

The data disc storage unit 13 is equipped with plural slots, and each slot can house one optical disc 40.

The spare disc storage unit 132 is not used in the normal operation of the optical disc library apparatus 10, and if the inspection value of an optical disc is judged to exceed a degradation detection threshold in the optical disc inspection, the spare disc storage unit 132 provides one of optical discs 40 with which the former optical disc is replaced.

The discarded disc storage unit 133 stores an optical disc 40 the inspection value of which is judged to exceeds the degradation detection threshold in the optical disc inspection performed by the optical disc library apparatus 10.

The library control unit 11 has a function to control the entire operation of the optical disc library apparatus 10. In the case where data access is performed on an optical disc 40 stored in the data disc storage unit 13, that is, in the case where data stored in the optical disc 40 is reproduced or data is written onto the optical disc 40, the library control unit 11 puts the changer mechanism 12 into operation so that a predefined optical disc 40 is brought out from the data disc storage unit 13 and fed to and loaded onto one of the optical drives 30 which performs data access on the predefined optical disc 40. On the other hand, the library control unit 11 puts the changer mechanism 12 into operation so that an optical disc 40 on which data access has not been performed for a certain period is ejected from an optical drive 30 which had performed data access on the optical disc 40, and the optical disc 40 is fed to and housed in a predefined slot of the data disc storage unit 13. In addition, the library control unit 11 is coupled to each optical drive 30 via the optical drive selection unit 15 and the drive interface 16, and transmits various commands such as a recording command and a reproduction command to a predefined optical drive 30.

The optical disc monitoring unit 17 performs the status management of the optical discs 40, and the memory 18 stores the management information of data that is recorded in each optical disc 40 and that is detected by the optical disc monitoring unit 17, the recording quality of each optical disc 40, and the inspection cycle of each optical disc 40 and the environmental temperature.

The thermometer 19 monitors the internal temperature of the optical disc library apparatus 10. When the library control unit 11 issues an environmental temperature acquisition request to the thermometer 19, the thermometer 19 transmits the measurement result of the current environmental temperature to the library control unit 11. The optical disc monitoring unit 17 periodically receives the measurement results of the environmental temperature from the library control unit 11, and stores the measurement results in the memory 18.

Figure 3:
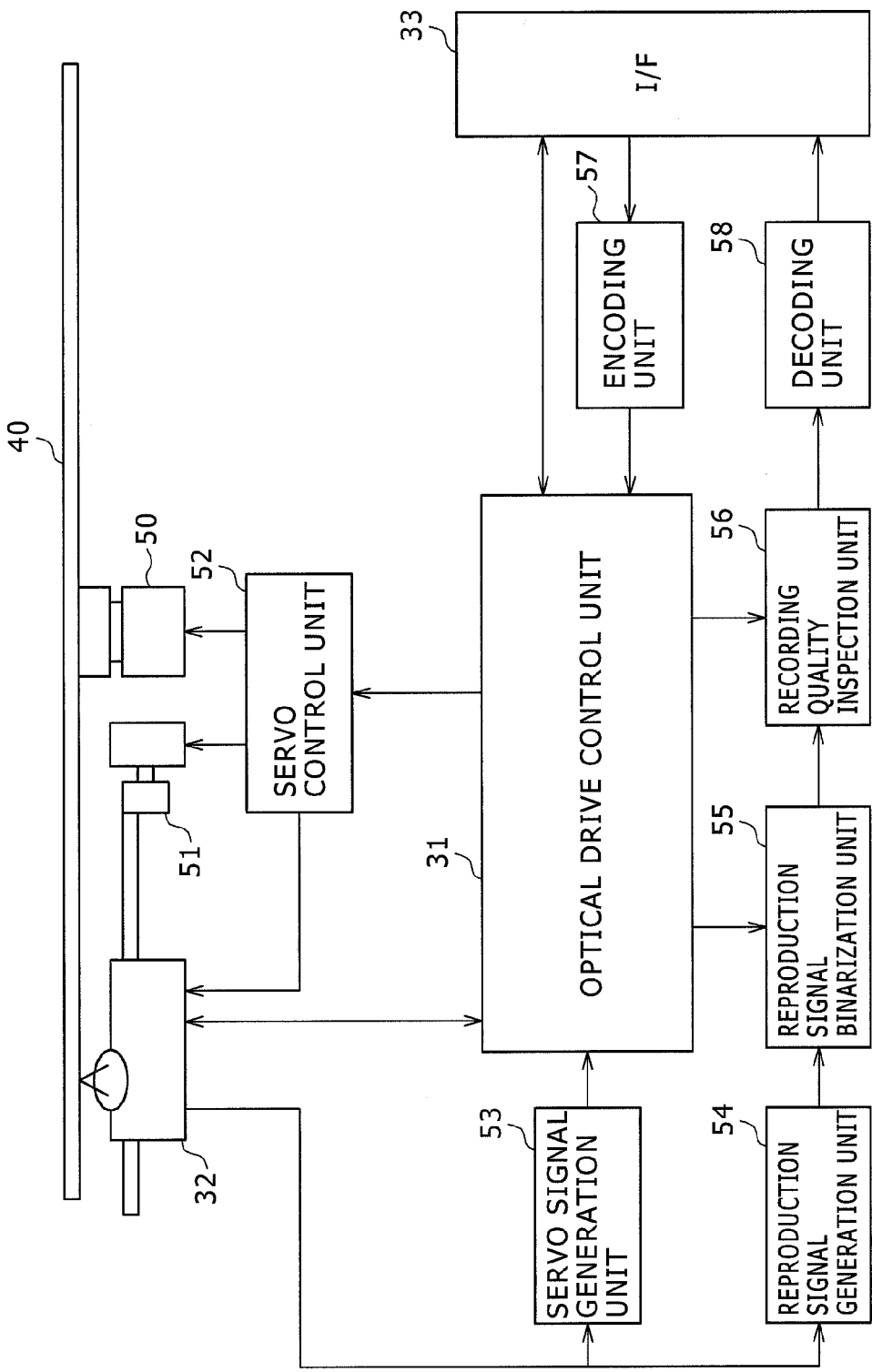
FIG. 3 is a block diagram of an optical drive according to the first embodiment.

FIG. 3 is a block diagram of the optical drive 30 according to the first embodiment. The optical drive 30 includes: an optical drive control unit 31; an optical pickup 32; a controller interface 33; a disc rotary mechanism 50; a slider mechanism 51; a servo control unit 52; a servo signal generation unit 53; a reproduction signal generation unit 54; a reproduction signal binarization unit 55; a recording quality inspection unit 56; an encoding unit 57; and a decoding unit 58.

The optical drive control unit 31 controls the entire operation of the optical drive 30. To put it concretely, via the servo control unit 52, the optical drive control unit 31 performs the rotary control of an optical disc 40 mounted on the disc rotary mechanism 50, performs the seek control and feed control to displace an optical pickup 32 in the radius direction of the optical disc 40 by driving the slider mechanism 51, and performs the focus control and tracking control by driving the objective lens of the optical pickup 32.

In addition, the optical drive control unit 31 controls the laser emission of the optical pickup 32. In the recording performed by the optical drive 30, a recording data signal transmitted from the library control unit 11 via the controller interface 33 is converted into an NRZI signal based on a predefined modulation scheme by the encoding unit 57, and the NRZI signal is supplied to the optical drive control unit 31. The optical drive control unit 31 converts this NRZI signal into a recording strategy (an emission pulse string), and emits a pulse string of laser light with a predefined light intensity.

The reflected light quantity from the optical disc 40 is received by the optical receiver of the light pickup 32, and converted into an electric signal, and the electric signal is transmitted to the servo signal generation unit 53 and the reproduction signal generation unit 54. The servo signal generation unit 53 selects one out of plural types of servo signals with the use of a method suitable for the mounted optical disc 40, generates the selected type of servo signal, and provides the generated servo signal to the optical drive control unit 31. Servo signals include at least a focus error signal and a tracking error signal. The optical drive control unit 31 drives the objective lens on the basis of these servo signals via the servo control unit 52 as mentioned above, and puts a focus servo and a tracking servo into operation.

The reproduction signal generation unit 54 includes a waveform equalizing circuit and an A/D converter, and after performing a predefined wave equalization on an analog reproduction signal provided by the optical pickup 32, the reproduction signal generation unit 54 performs sampling and quantization on the wave equalized analog reproduction signal so that the wave equalized analog reproduction signal is converted into a digital signal. Subsequently, the reproduction signal generation unit 54 provides the digital signal to the reproduction signal binarization unit 55.

The reproduction signal binarization unit 55 includes a transversal filter and a Viterbi decoding circuit. The digital signal provided from the reproduction signal generation unit 54 is equalized by the transversal filter so as to become a digital signal corresponding to a predefined PR class. Subsequently, the Viterbi decoding circuit performs the maximum likelihood decoding on this equalized signal so that this equalized signal is converted into an NRZI signal based on a predefined modulation scheme. The NRZI signal generated by the reproduction signal binarization unit 55 is converted into a reproduction data signal after being demodulated by the decoding unit 58, and is transmitted to the library control unit 11 via the controller interface 33.

The recording quality inspection unit 56 is capable of inspecting a reproduction error rate by performing data error correction and the like. In addition, the recording quality inspection unit 56 is capable of inspecting the waveform symmetry index β of a reproduction signal and the modulation M of signal amplitude that are the inspection indexes of the recording quality, or a jitter that is the fluctuation component of a binarized signal along the time axis.

The optical disc library apparatus 10 periodically inspects the quality of the optical discs 40 and creates disc management information and measurement history information, and stores these pieces of information in the memory 18 via the optical disc monitoring unit 17. This optical disc library apparatus 10 periodically inspects the qualities of all optical discs 40 on which data have already been recorded and that are stored in the data disc storage unit 13. If the inspection result of one of these discs exceeds the degradation detection threshold, data recorded in the relevant optical disc is rewritten onto one of optical discs 40 stored in the spare disc storage unit 132. The detail of the above operation will be described below.

Figure 1:
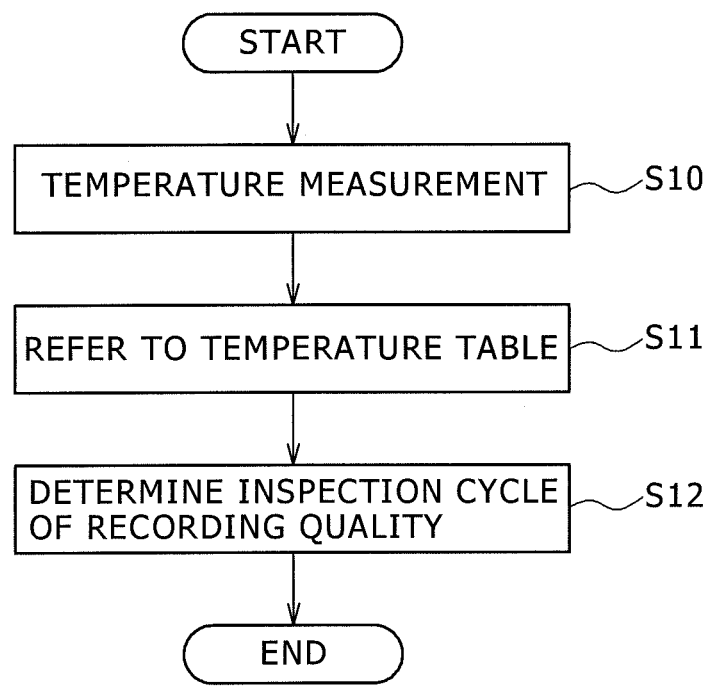
FIG. 1 is a flowchart for determining the inspection cycle of an optical disc according to a first embodiment.

FIG. 1 is a flowchart in which the optical disc library apparatus 10 determines the inspection cycle of an optical disc 40 according to the first embodiment. The library control unit 11 periodically measures the temperature of the optical disc library apparatus 10 using the thermometer 19 (at step S10). With the use of the measurement result, the optical disc monitoring unit 17 refers to a table showing the relationship between the current environmental temperature and the degradation progressive degree of the optical disc 40 under the current environmental temperature (at step S11). FIG. 5 is a table showing environmental temperatures and inspection cycles. The library control unit 11 determines the inspection cycle in accordance with temperature ranges shown in FIG. 5 (at step S12). The result of temperature measurement and the change method of the inspection cycle will be explained later. Subsequently, the library control unit 11 inspects all optical discs 40, on which data have already been recorded and that are stored in the optical disc library apparatus 10, in order in accordance with an appropriately updated recording quality inspection schedule.

Next, the update method of the recording quality inspection schedule performed by the library control unit 11 will be explained with reference to FIG. 6 and FIG. 7.

Figure 6:
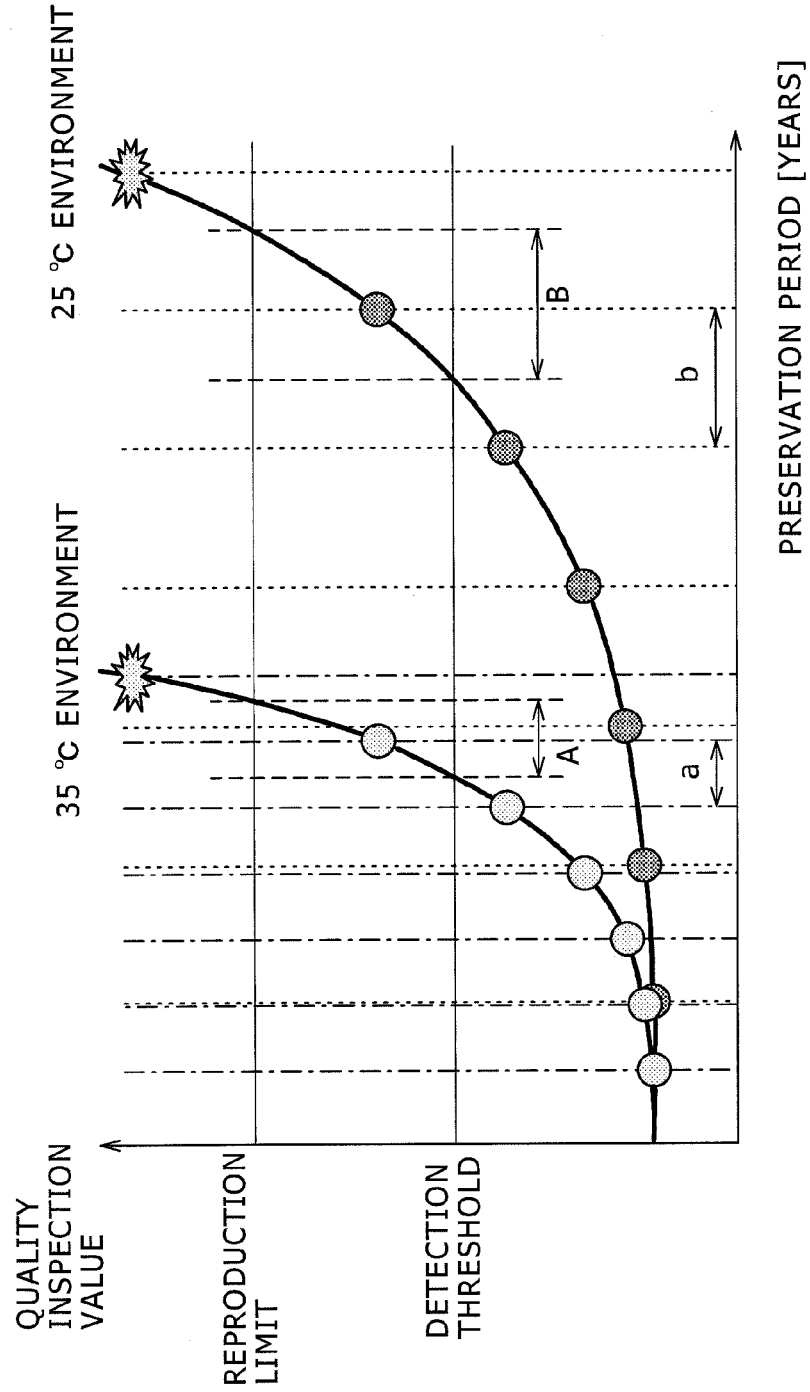
FIG. 6 is a diagram showing the lifetime prediction of an optical disc.
Figure 7:
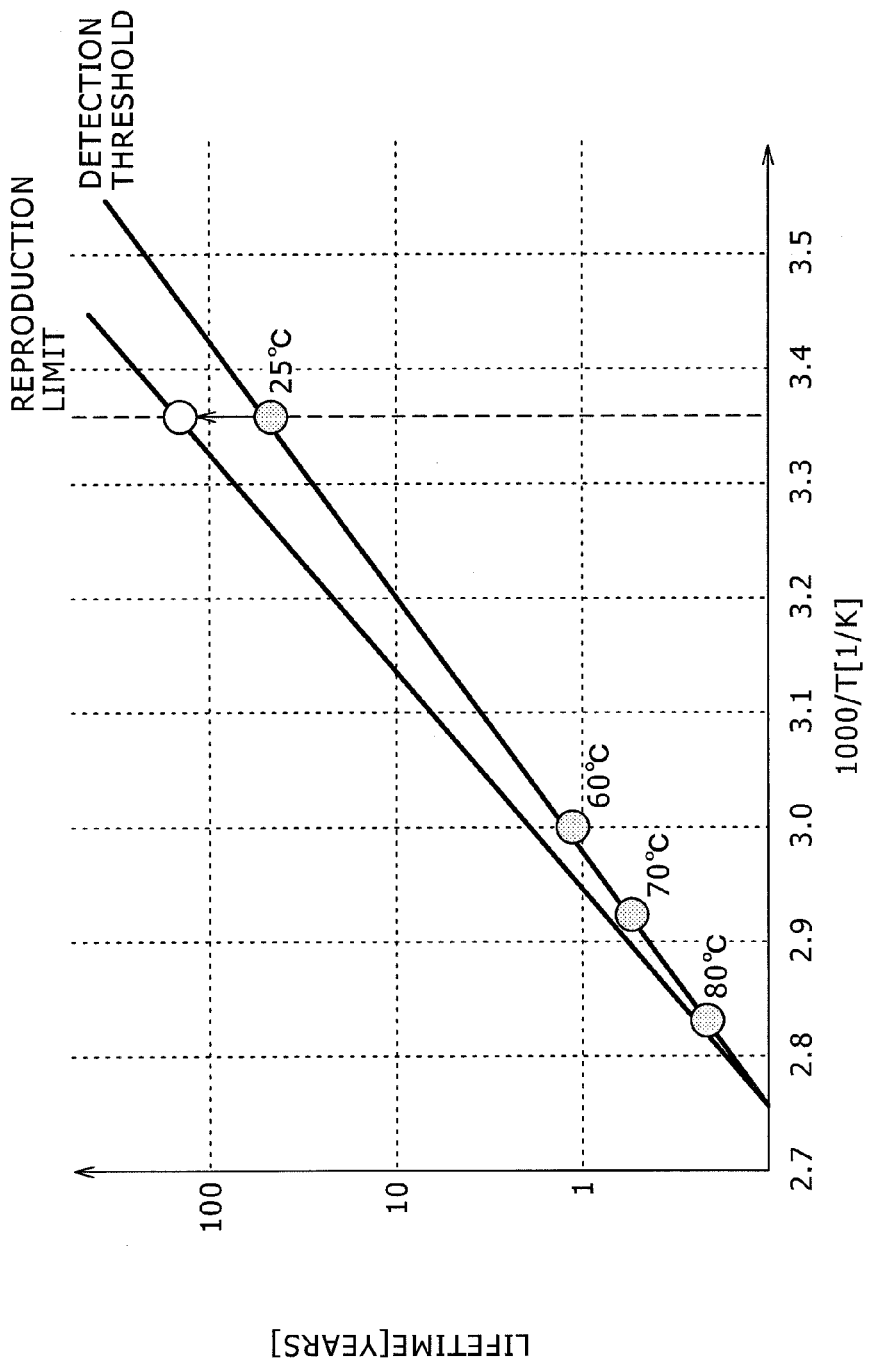
FIG. 7 is a diagram showing the relationship between environmental temperatures and the lifetimes of an optical disc.

FIG. 6 is a diagram showing the lifetime prediction of an optical disc estimated by the Arrhenius model or the like. The Arrhenius model is a chemical reaction model in which temperature is treated as an activation energy and the failure prediction of an evaluated material is performed in accordance with the change of the environmental temperature. FIG. 6 shows the transition of a quality inspection value in a high temperature (35° C.) environment and the transition of the quality inspection value in a low temperature (25° C.) environment. Activation energy in the high temperature environment is larger than activation energy in the low temperature environment, therefore the progress of chemical reaction is more rapid and the progress rate of the degradation of an optical disc is larger in the high temperature environment. In the case where optical discs are stored for a long time, it is thinkable that an optical disc stored in the 35° C. environment may make a reproduction error earlier than an optical disc stored in the 25° C. environment. Therefore, by making the inspection cycle b for each optical disc 40 stored in the 25° C. environment shorter than the time period B between the time at which the quality inspection value of the optical disc 40 reaches the degradation detection threshold used as a criterion for recommendation of rewriting the data of the optical disc 40 in the optical disc library apparatus 10 and the time at which the optical disc 40 actually makes a reproduction error, the rewriting can be appropriately performed in the quality inspection, and the reliability of the optical disc library apparatus 10 can be secured. In addition, the situation in the 35° C. environment is thought to be similar to the above situation, and each optical disc 40 stored in the 35° C. environment is inspected with the inspection cycle a shorter than the time period A between the time at which the quality inspection value of the optical disc 40 reaches the degradation detection threshold used as a criterion for recommendation of rewriting the data of the optical disc 40 and the time at which the optical disc 40 actually makes a reproduction error. With the use of the above-described method, it becomes possible that, without making a reproduction error in the optical disc library 10, the request of rewriting is issued to the host computer 20 and the rewriting is appropriately performed. In addition, although it has been assumed that the quality is shown by the error rate or the number of errors calculated by the error correction, it is conceivable that the quality is shown by the waveform symmetry index β of a reproduction signal and the modulation M of signal amplitude that indirectly show the tendency of the quality, or a jitter that is the fluctuation component of a binarized signal along the time axis.

In the present invention, the way to determine the degradation detection threshold for an optical disc, a reproduction error, and arrival times spent for reaching the degradation detection threshold and the reproduction error, that is, predicted degradation times become important factors. FIG. 7 shows the relationship between the environmental temperatures and the lifetimes of an optical disc. The environmental temperature is an ambient temperature in which an optical disc is stored, and the lifetime of the optical disc is a numerical value of an error rate in error correction that shows a criterion large enough to be unable to secure interchangeability, and it will be assumed that the degradation detection threshold for a blue-ray disc is $4.2 \times 10^{-3}$ according to the present invention. In addition, when the error rate is $2.0 \times 10^{-2}$, it is judged that the reproduction error occurs although this figure varies in some degree depending on the cause of the error. However, these figures are not limited to the above figures. In accordance with the reproduction capability of an optical disc or the control method performed in the optical disc library apparatus, these figures can be changed. FIG. 7 shows three measured arrival times spent for reaching the degradation detection threshold obtained in actual inspections while the environmental temperature changes from 80° C., 70° C., to 60° C. In these environmental temperatures, the times spent for the error rate to reach $4.2 \times 10^{-3}$ are plotted as three points 80° C., 70° C., and 60° C. An approximate line for these three points is drawn, and a lifetime prediction time for 25° C. obtained by extrapolation with the use of this approximate line is shown in FIG. 7. For example, an extrapolation point (25° C., 50.0 years) is obtained by the extrapolation with the use of the three points (80° C., 0.19 year), (70° C., 0.46 year), and (60° C., 1.18 years) in FIG. 7. Next, the relationship between the lifetime prediction time and the reproduction limit (reproduction error) will be explained. If it takes 60 years to reach the error rate that shows the reproduction error in the environmental temperature 25° C., it can be predicted that the reproduction error occurs after the elapse of 1.2 times the lifetime prediction time for 25° C. In other words, if the inspection of all the data-recorded optical disc has been completed during the time period between the lifetime prediction time for 25° C., that is, the time when the error rate reaches the degradation detection threshold and 1.2 times the lifetime prediction time for 25° C., reproduction errors of all the optical discs owing to aged degradation can be prevented from occurring.

Although FIG. 5 shows the relationship between the environmental temperatures and the inspection cycles in a table format, the relationship between the absolute temperatures and the lifetimes is represented by a linear approximate expression. Therefore, it is conceivable that, after this linear approximate expression is stored in the memory, the length of the inspection cycle is appropriately determined in accordance with the measured value of the environmental temperature. In addition, in a preservation environment with a large temperature variation or in a transportation environment, there is a case where not only an average value of temperatures but also a peak value of the temperatures during the relevant measurement period becomes dominant in the prediction of the inspection cycle. Therefore, the inspection cycle can be calculated with the use of the maximum value of the environmental temperatures during the relevant measurement period or with the use of both average value and weighted value of the maximum value during each temperature measurement period.

The optical disc monitoring unit 17 calculates the inspection cycle of an optical disc on the basis of the environmental temperature obtained with the use of any of the above-mentioned calculation methods, and updates the inspection cycle of the optical disc. In the case where the worst condition (the maximum temperature condition) of the preservation environment for the optical disc is assumed to be 80° C., the degradation period between the time when the inspection value exceeds the degradation detection threshold and the time when the reproduction error occurs can be predicted to be about two weeks. Therefore, it is desirable that the update of the inspection cycle of the optical disc should be performed with the use of an average value of temperature calculated at least once a week. This is because, if the average value of temperature calculated once a day or once a shorter period is used, there is a possibility that the temperature variation through a day or special conditions such as the condition in which the optical disc is being transported may highly sensitively affect the inspection cycle. In addition, because an optical disc is an appropriate medium for storing data in a long period, if the average value of temperature is calculated more frequently than once a week, there is concern that the calculation may adversely affects the normal operation of the optical disc library apparatus. It is preferable that the library control unit 11 keeps the occupation ratio for the optical disc inspection 1 percent at the largest. This is because the optical disc inspection is not the main object of the operation of the optical disc library apparatus, and the long storage characteristic of the optical discs can be effectively utilized by keeping the occupation ratio for the optical disc inspection low. Here, the occupation ratio of 1 percent is the percentage of the time period, during which one optical drive inspects about one optical disc a week, to the entire operation time period of the optical disc library apparatus 10.

Figure 8:
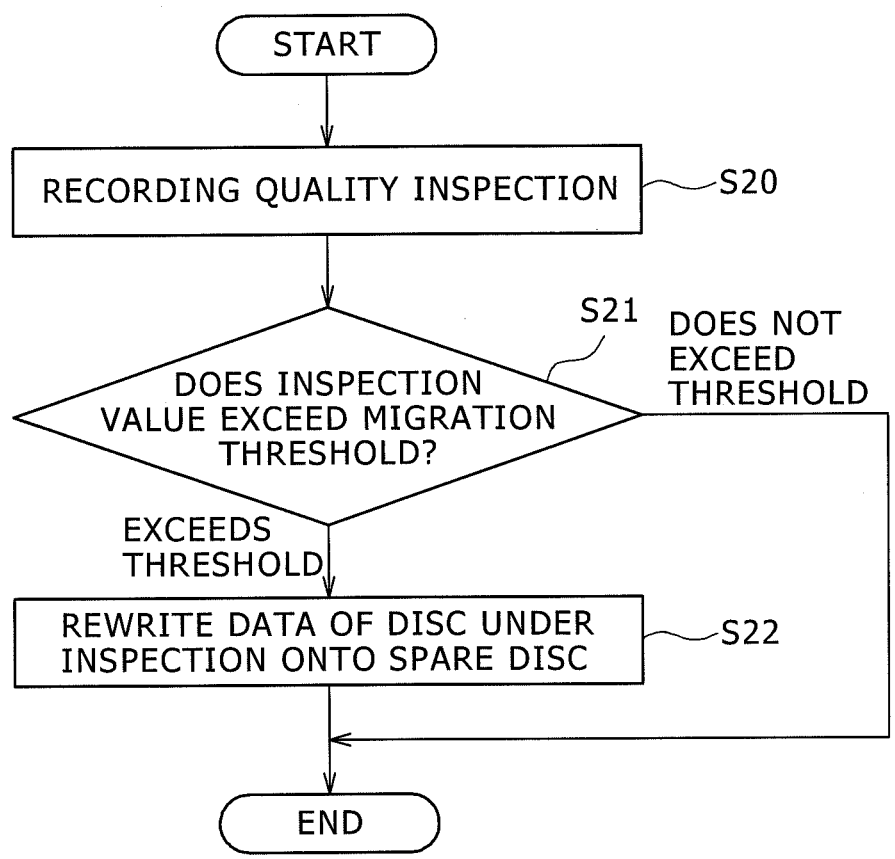
FIG. 8 is a flowchart for explaining an optical disc inspection according to the first embodiment.

FIG. 8 is a flowchart for explaining the optical disc inspection. First, the order for optical discs to be inspected is determined in advance by the optical disc monitoring unit 17, although not shown in FIG. 8. This order can be determined in accordance with the management numbers of the slots of the data disc storage unit 13, or in accordance with the identifiers peculiar to individual optical discs. Next, the library control unit 11 instructs the changer mechanism 12 to feed an optical disc 40 to be inspected next to an optical drive 30 on the basis of the inspection cycle of the optical disc determined in FIG. 1. After the changer mechanism 12 to feed the relevant optical disc 40 to an optical drive 30, the optical drive 30 loads the optical disc 40 and starts inspecting the recording quality of the optical disc 40 (at step S20). Although it is desirable that the recording quality should be shown by an error rate calculated with omitting burst errors that continuously occur, an error rate that is generally calculated can be used as the recording quality, or the waveform symmetry index β of a reproduction signal and the modulation M of signal amplitude that are the indirect indexes of the recording quality, or a jitter that is the fluctuation component of a binarized signal along the time axis can be used as the recording quality. Here, a recording quality inspection is an operation in which the library control unit 11 loads the optical discs onto optical discs in order, and calculates the number of errors or error ratio per each of the error correction blocks of each optical disc. The optical disc monitoring unit 17 stores the ID of the inspected optical disc 40, the number of errors or error rate per each of the error correction blocks, and the address of the error correction block in the memory 18 as the inspection result of the optical disc 40. However, because there is the limitation of the memory size, it is not always necessary to store the data of all the error correction blocks. Because blocks that are inferior in their recording quality are actually problematic, it is conceivable that only the number of errors or error rate of an error correction block with the worst quality is stored, or only the numbers of errors or error rates of plural error correction blocks that include the error correction block with the worst quality are stored.

Next, the library control unit 11 judges whether the result of the recording quality inspection exceeds a migration threshold, that is, the degradation detection threshold $4.2\times 10^{-3}$ or not (at step S21). In addition, the value of the criterion used for the above judgment is not limited to the above numerical value $4.2\times 10^{-3}$. It is possible to change the above numerical value in accordance with the reproduction capability of an optical disc to be inspected or the control method of the optical disc library apparatus. If the quality inspection value of an optical disc exceeds the degradation detection threshold, the data of the optical is rewritten onto a spare optical disc 40 stored in the spare disc storage unit 132. If the quality inspection value of the optical disc is lower than the degradation detection threshold at step S21, it can be assured that the data of the optical disc can be reproduced at least until the next inspection of the optical disc. The library control unit 11 therefore instructs the data disc storage unit 13 to feed the relevant optical disc 40.

Second Embodiment

Figure 9:
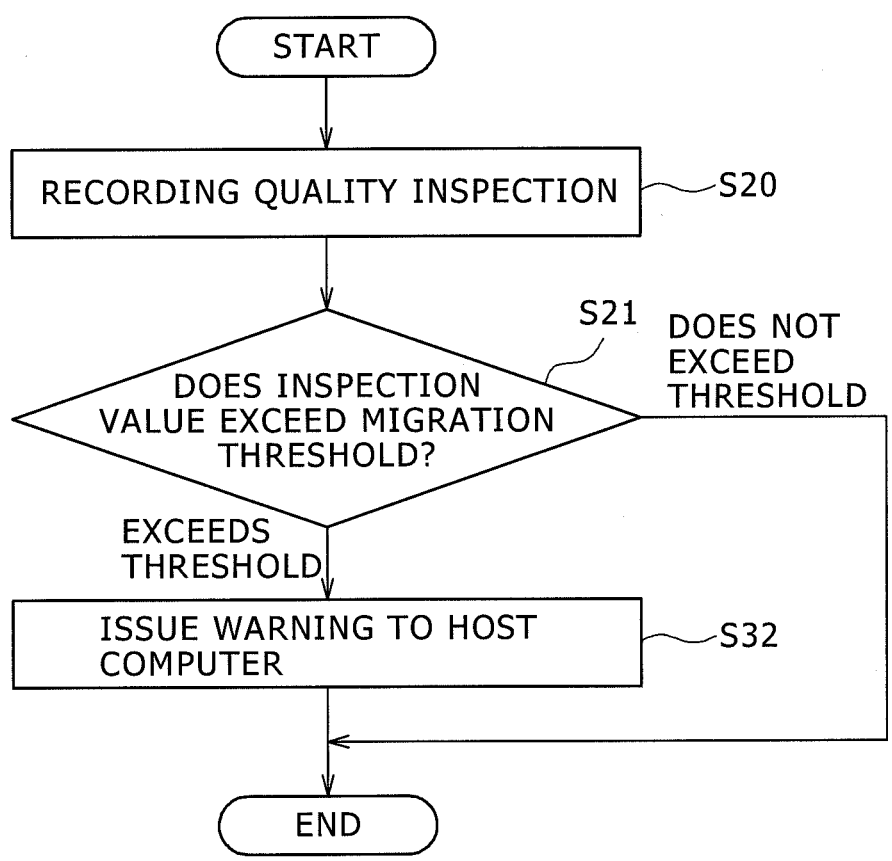
FIG. 9 is a flowchart for explaining an optical disc inspection according to a second embodiment.

FIG. 9 is a flowchart for explaining an optical disc inspection according to a second embodiment. In the following description, only points different from those of the first embodiment will be explained, and steps having the same functions as the functions of steps in FIG. 8 will be denoted by the same reference numerals, and redundant descriptions thereof will be omitted.

In the flowchart of the optical disc inspection according to the second embodiment, the step in the case where a quality inspection value exceeds the migration threshold, that is, the degradation detection threshold is different from the step in the first embodiment. If the quality inspection value of an optical disc 40 exceeds the migration threshold, the library control unit 11 issues a warning to the host computer, so that notification that the quality inspection value has exceeded the migration threshold is provided to a user of the optical disc library apparatus 10, an administration company of the optical disc library apparatus 10, and the like (at step S32). The method adopted in this embodiment is an effective method in the case where the optical disc library apparatus 10 does not include the spare disc storage unit 132, nor the discarded disc storage unit 133, and in the case where the spare disc storage unit 132 stores no optical disc 40. This warning shows a herald that the operation of the optical disc library apparatus 10 becomes difficult owing to the fact that the condition of the optical disc 40 mounted on the optical disc library apparatus 10 is degraded or the environment is degraded. If this warning is issued, it is desirable that the data of the optical disc 40 mounted on the optical disc library apparatus 10 should be quickly rewritten onto another optical disc.

Third Embodiment

Figure 4:
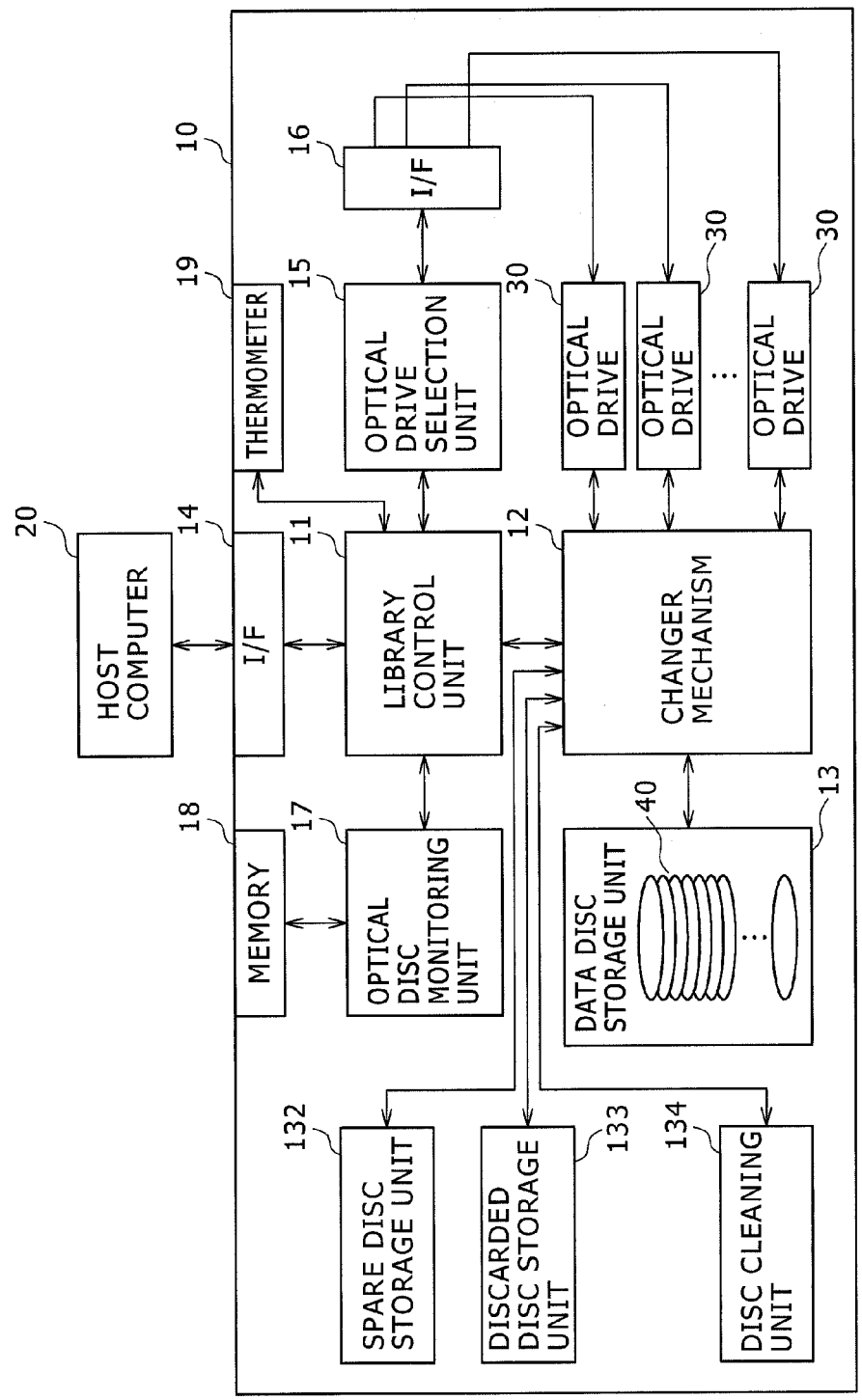
FIG. 4 is a block diagram of an optical disc library apparatus according to a third embodiment.
Figure 10:
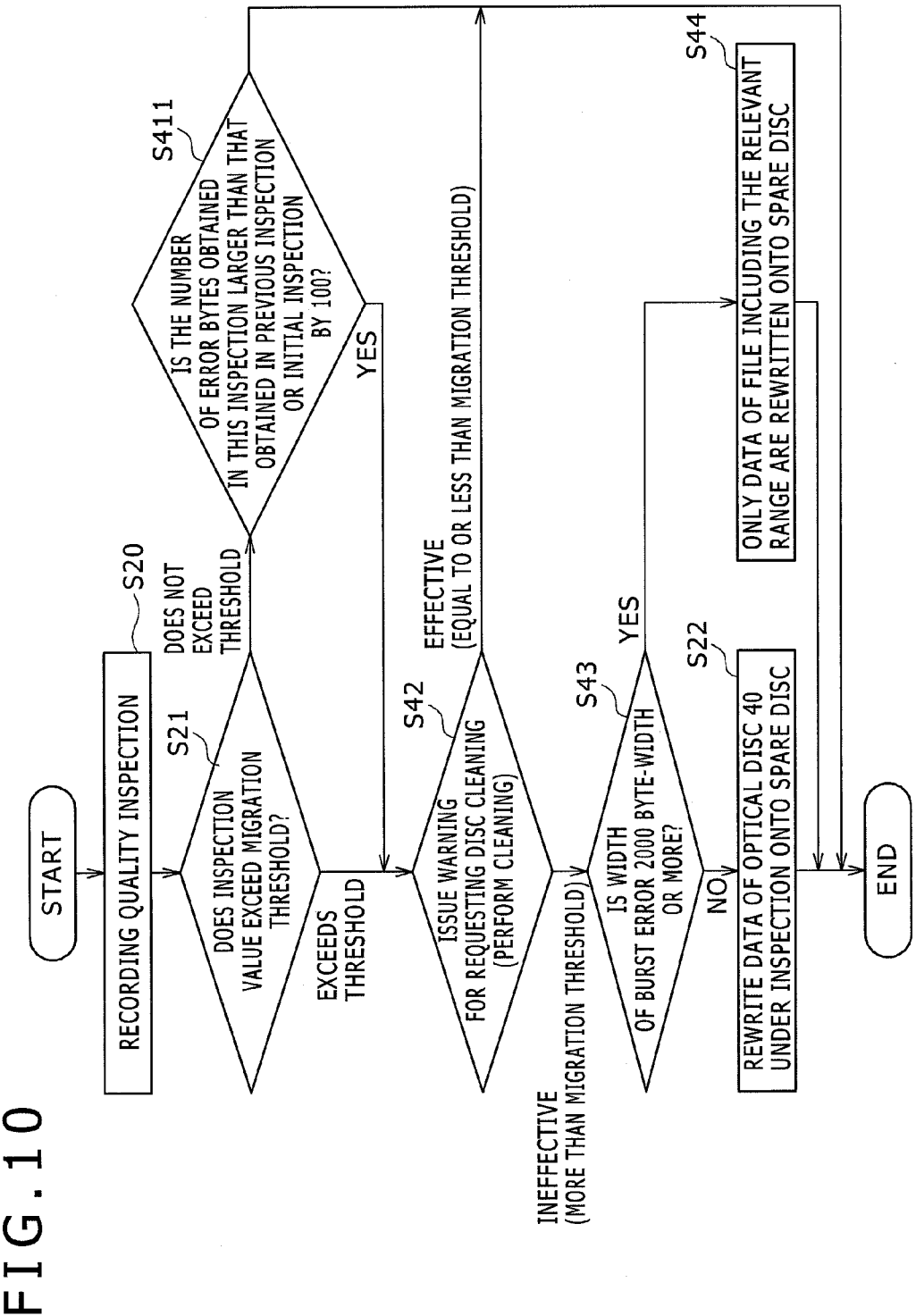
FIG. 10 is a flowchart for explaining an optical disc inspection according to a third embodiment.

FIG. 4 is a block diagram of an optical disc library apparatus according to a third embodiment, and FIG. 10 is a flowchart for explaining an optical disc inspection according to the third embodiment. In the following description, only points different from those of the first embodiment will be explained, and steps having the same functions as the functions of steps in FIG. 8 will be denoted by the same reference numerals, and redundant descriptions thereof will be omitted.

FIG. 4 is a block diagram that is equivalent to the block diagram shown in FIG. 2 to which a disc cleaning unit 134 is added. In addition, in the flowchart of the optical disc inspection shown in FIG. 10, steps after the judgment whether the quality inspection value of an optical disc exceeds the migration threshold, that is, the degradation detection threshold or not (step S21) are different from the steps in the first embodiment. In the case where the quality inspection value of the optical disc is smaller than the migration threshold, it is judged that the optical disc is not degraded. However, there is an actual case where the degradation of an optical disc is confirmed when the quality inspection value of the optical disc is compared with the recorded initial state of the optical disc even if the quality inspection value is smaller than the migration threshold. In order to accurately detect such a case, an accurate judgment can be made by comparing the quality inspection value of the optical disc with the recorded initial state of the optical disc or with the result of the previous inspection of the optical disc. At step S411, if the number of error corrections increases by 100 bytes or more when compared with the result of the first inspection, that is, with the result of the inspection just after recording data on the optical disc, or with the result of the previous inspection of the relevant optical disc, this is a steep change of the recording quality, and it is thinkable that this steep change is caused by the degradation of the optical disc, or by external disturbances such as dust and flaws. Therefore, proactive measures can be taken before the quality inspection value reaches the migration threshold by issuing a warning for requesting disc cleaning against the degradation of the reproduction capability of the optical disc in advance even if the quality inspection value is smaller than the migration threshold. In addition, although the above explanation has been made in such a way that the warning is issued if the quality inspection value, that is, the number of error corrections increases by 100 bytes or more, the increasing number of bytes is not limited to 100. For example, this number is a numerical value that is derived in consideration of the reproduction capability of the relevant optical disc, the control method of the optical disc library apparatus, an adopted modulation scheme, or the like.

There are two criterions: one is a criterion used for judging whether the recording quality of the relevant optical disc is steeply degraded or not, and the other is a criterion used for judging whether the recording qualities of other discs, that is, the recording qualities of all the optical discs are steeply degraded or not. If the steep degradation of the recording quality of the relevant optical disc is confirmed, it can be judged that this degradation is brought about by a specific cause, while if the recording qualities of other optical discs have characteristics similar to the recording quality of the relevant optical disc, it can be judged that these characteristics are brought about by a variation cause that varies the recording qualities of all the optical discs. For example, in the case where dust flows into the optical disc library owing to the change of the ambient environmental condition, a large number of burst errors may be detected although the number of the burst errors depends on the amount of the dust. As a result, the relevant optical disc is cleaned first, and if the recording quality of the relevant optical disc is not improved, it can be judged that the degradation is caused by a flaw or the like and it is impossible to remove the flaw or the like. In a relative quality inspection of the other optical discs, an average value of the numbers of error corrections obtained in the inspections of the other optical discs from the beginning is used in order to detect the overall trend of the recording qualities of all the optical discs. When the average value of the numbers of error corrections of the other optical discs and the number of error corrections of the relevant optical disc are compared with each other, if the latter number is larger than the former number by 100 bytes or more, it can be judged that the change of the number of error corrections of the relevant optical disc is steep and something abnormal has occurred in the recording quality of the relevant optical disc. Therefore, if, even in a relative quality inspection with the use of the average value of the numbers of error corrections of the other optical discs, it is confirmed that the number of error corrections of the relevant optical disc is larger than the average value of the numbers of error corrections of the other optical discs by 100 bytes or larger, proactive measures can be taken before the quality inspection value reaches the migration threshold by issuing a warning for requesting disc cleaning against the degradation of the reproduction capability of the relevant optical disc in advance at step S42 as is the case with at step S411.

In addition, an average moving value of quality inspection values can be used in the calculation of the average value. If the variation of the environmental temperature is small such as 1 or 2° C., and the inspection interval is about one month, it can be judged that the variation of the environment is not large. For example, if the inspection schedule shows that about two optical disc are inspected a week, a relative comparison is performed with the use of an average value obtained by averaging quality inspection values included in the histories of about 10 optical discs a month. Because it is thinkable that there are individual differences among optical discs, it is desirable that the average value obtained by averaging the quality inspection values of at least 10 optical discs should be used. In addition, in the relative comparison with the other optical discs, the quality inspection value used as the degradation detection threshold can be changed. Because the detection sensitivity varies in accordance with the population parameter used for calculating the criterion by averaging the quality inspection values, attention should be paid to this fact.

If the quality inspection value exceeds the migration threshold, the library control unit 11 issues a warning for requesting that the optical disc 40 should be cleaned to the host computer (at step S42). By issuing the warning for requesting the cleaning of the optical disc 40, the library control unit 11 provides notification that the state of the optical disc is degraded to a user of the optical disc library apparatus 10, or an administration company of the optical disc library apparatus 10. Subsequently, the library control unit 11 instructs the changer mechanism 12 to feed the optical disc 40 to the disc cleaning unit 134. The changer mechanism 12 feeds the optical disc 40 to the disc cleaning unit 134. The disc cleaning unit 134 performs cleaning on the surface of the relevant optical disc 40 so that dust attached to the surface of the optical disc 40 or flaws on the surface of the optical disc 40 may be removed.

Subsequently, the library control unit 11 instructs the changer mechanism 12 to feed the relevant optical disc 40 to an optical drive 30. The changer mechanism 12 feeds the optical disc 40 from the disc cleaning unit 134 to the optical drive 30. The optical drive 30 loads the optical disc 40 and inspects the recording quality of the optical disc 40 again. If the disc cleaning is effective and the quality inspection value is smaller than the degradation detection threshold as a result of the recording quality inspection, the optical disc inspection is finished because the recording/reproducing operation of the optical disc can be performed without troubles as is the case with a normal optical disc. If the disc cleaning is not effective and the quality inspection value exceeds the degradation detection threshold again as a result of the recording quality inspection, the library control unit 11 judges whether a burst error that is a series of continuous errors has occurred in the recording-quality degraded region of the optical disc or not in order to accurately specify a cause of the degradation (at step S43). If the width of the burst error is less than 2000 byte-width, the cause of the degradation of the optical disc 40 is not the burst error but a kind of flaw the optical disc itself has, therefore the data of the inspected optical disc is rewritten onto an optical disc 40 stored in the spare disc storage unit 132 (at step S22).

Next, at step S43, if the width of the burst error is 2000 byte-width or more, the cause of the degradation of the optical disc 40 is the burst error, therefore the library control unit 11 extracts a data file of the relevant optical disc 40 that includes the burst error and rewrites only the relevant data file onto an optical disc 40 stored in the spare disc storage unit 132. Although the critical width of the burst error has been set to 2000 byte-width in the above description, this critical width is not limited to 2000 byte-width. For example, this critical length is derived in consideration of the reproduction capability of an optical disc or the system control of the optical disc library apparatus.

As described above, the optical disc library apparatus 10 can perform an appropriate rewriting in accordance with the cause of the quality degradation of an optical disc 40.

Fourth Embodiment

Figure 11:
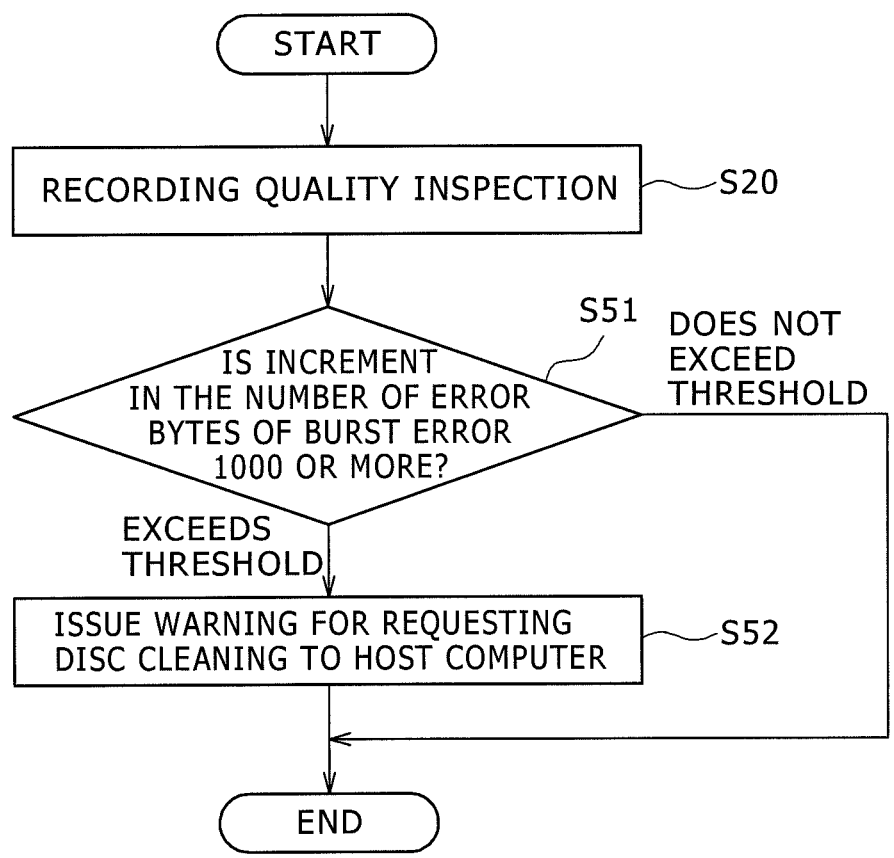
FIG. 11 is a flowchart for explaining an optical disc inspection according to a fourth embodiment.

FIG. 11 is a flowchart showing a fourth embodiment. A block diagram showing the fourth embodiment is the same as shown in FIG. 2. In the following description, only points different from those of the first embodiment will be explained, and steps having the same functions as the functions of steps in FIG. 8 will be denoted by the same reference numerals, and redundant descriptions thereof will be omitted.

Figure 19:
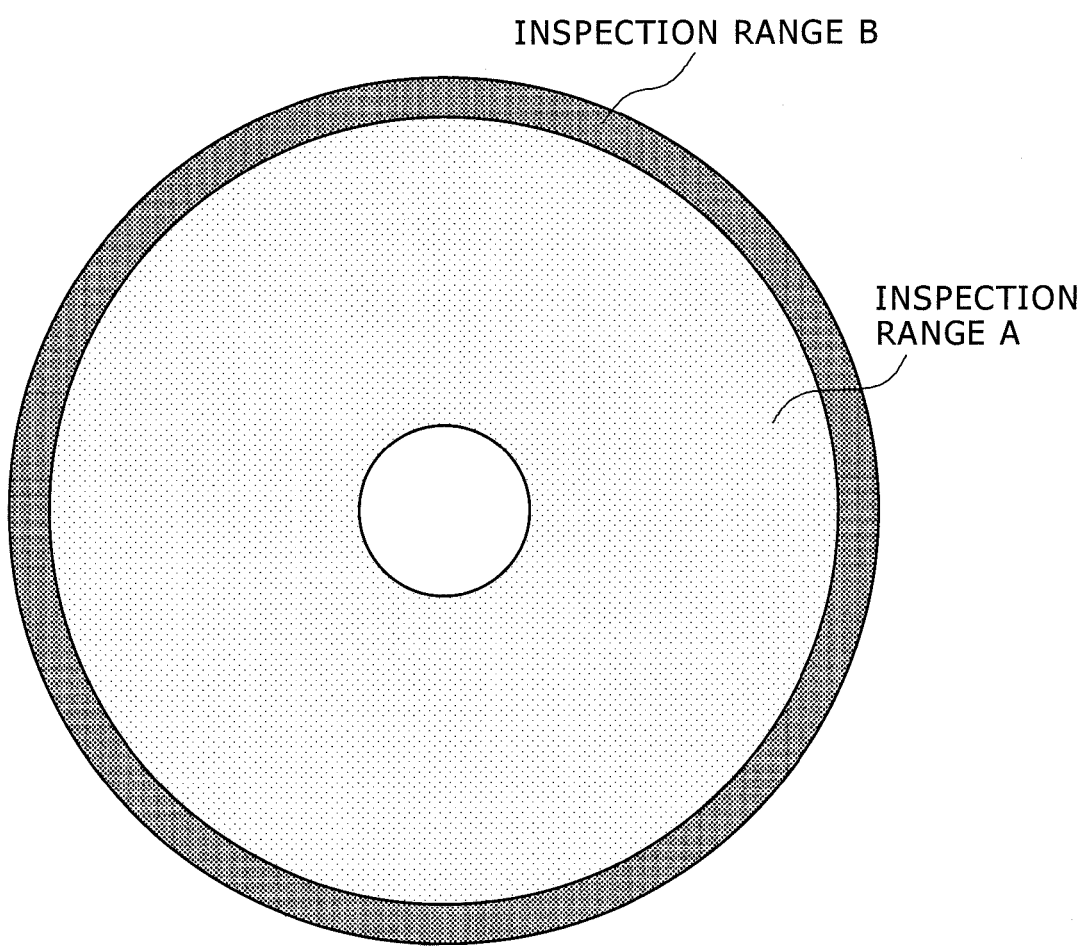
FIG. 19 is a diagram showing inspection regions of an optical disc within which a dust inspection is performed.

An optical disc brings about various detection results in the form of quality index in accordance with causes of its degradation in the form of quality index. Therefore, the causes of the degradation of the optical disc will be compared. Roughly speaking, the causes of the degradation of the optical disc can be classified into the aged degradation of the optical disc itself, flaws brought about by the operation system of the optical disc library apparatus, and dust owing to the preservation environment of the optical disc. Although these causes are detected in the form of degradations of the reproduction quality, the utilization efficiency of the optical disc can be improved by distinguishing the influences and the scope of the influences that are brought about by respective causes. It is predicted that the dust influences the surface of the optical disc more evenly when compared with other causes. The aged degradation tends to induce the change of recording quality in the outer circumferential part, that is, the edge part of the optical disc. In addition, the flaws of the optical disc often occur owing to a feeding mechanism of the optical disc library apparatus, and there is also a high possibility that the flaws occurs on the outer circumferential part of the optical disc. This is because contact points between the optical disc and the feeding mechanism exist on the outer circumferential part of the optical disc. Especially, while the diameter of the optical disc is 12 cm, the distance between the outer circumferential edge and the edge of the data region is only 2 mm, therefore the quality degradation occurs owing to the feeding mechanism with a high possibility. Next, it can be judged that the flaws that occur owing to the feeding mechanism, especially flaws that exist across a wide range of the surface of the optical disc, induce a burst error that is a series of continuous defects. As mentioned above, in the judgment of the types of degradations, it is dust that induces discrete burst errors across the entirety of an optical disc, and it is aged degradation or a flaw that induces burst errors in the outer circumferential part of an optical disc in a biased manner. FIG. 19 is a diagram showing inspection regions of an optical disc within which a dust inspection is performed. An inspection region A is an region between the inner circumference and the middle circumference of the optical disc, and it is thinkable that the inference of dust and the like are roughly uniform across the inspection region A. In contrast, an inspection B is the outer circumference portion (for example, an area between a circle with radius 58 mm and a circle with radius 55 mm) of the optical disc, and this region is influenced by dust, flaws owing to a feeding mechanism, aged degradation of recording quality, and the like. Therefore, it is difficult to uniquely specify a cause of a certain recording quality degradation.

Here, let's limit an inspection range to the inspection region A. The library control unit 11 detects only burst errors that continuously occur in the inspection region A. Burst errors owing to the defects of the optical disc itself, and burst errors owing to the dust are detected by accumulating the number of burst errors. An increment in the number of burst errors owing to the dust can be distinguished by detecting the difference between the number of the burst errors owing to the defects of the optical disc itself and the number of burst errors owing to the dust. A recording quality inspection shown in FIG. 11 is an inspection for detecting burst errors (at step S20). In order to judge whether a burst error has occurred or not, the current quality inspection value of the optical disc is compared with the result of the inspection after data being recorded on the optical disc, or with the result of the last inspection of the optical disc (at step S51). As a result, if the number of burst errors per each of the error correction blocks is 1000 bytes or more, it is thinkable that the recording quality of the optical disc is degraded by dust. Therefore, at step S52, the library control unit 11 identifies the dust in the storage environment for the optical disc as the cause of the quality degradation of the optical disc, and issues a warning for requesting that the optical disc should be cleaned to the host computer.

Figure 20:
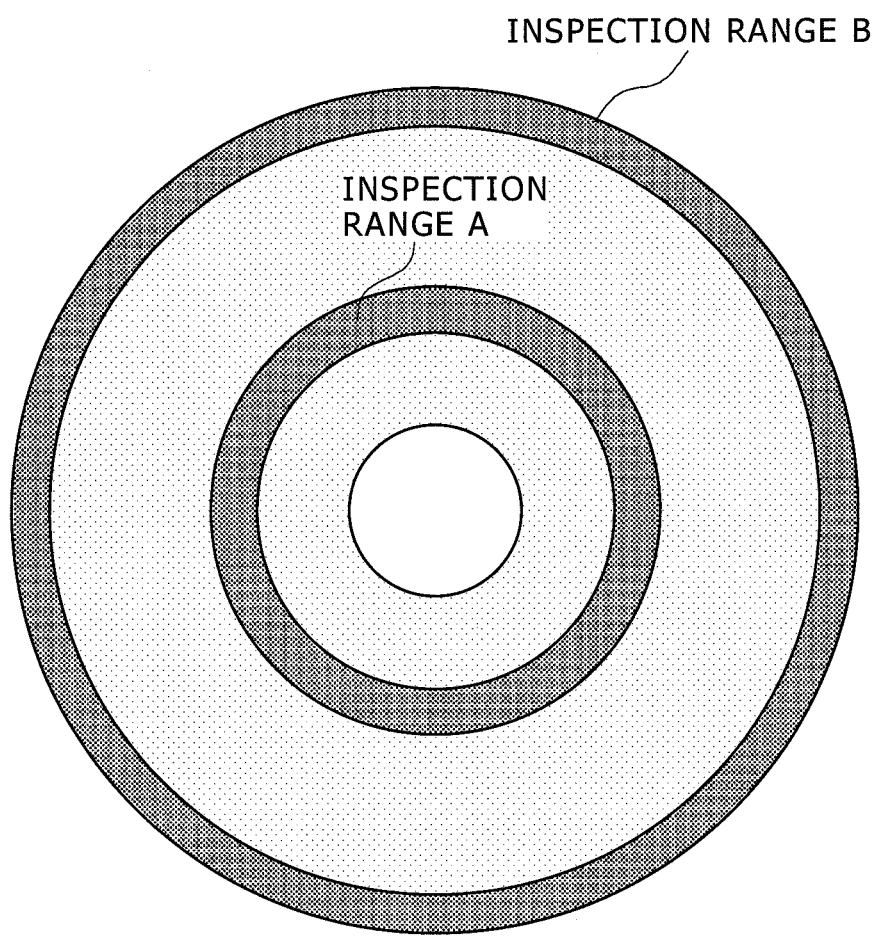
FIG. 20 is a diagram showing inspection regions of an optical disc within which a dust inspection is performed.

FIG. 20 is a diagram showing the inspection regions of an optical disc for dust inspection. The area of an inspection region A in FIG. 20 is different from that of the inspection region A in FIG. 19. In FIG. 19, the inspection region A is defined as the entire region of the optical disc minus the inspection region B. However, as shown in FIG. 20, it is all right if the inspection region A is defined as a part of the region between the middle circumference and the inner circumference of the optical disc. By limiting the area of the inspection region A, there is an advantage that the inspection time is shortened.

Fifth Embodiment

Figure 12:
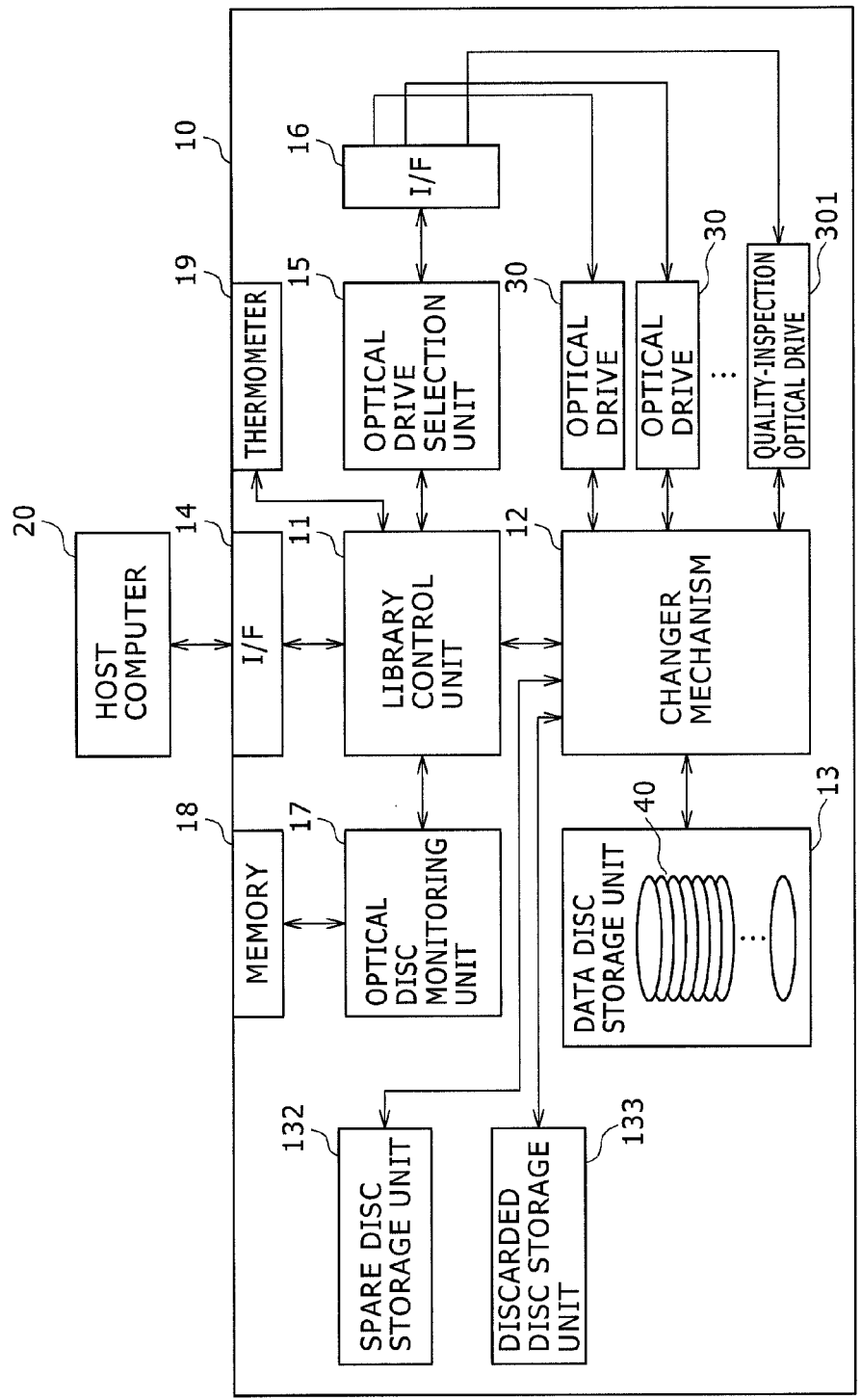
FIG. 12 is a block diagram of an optical disc library apparatus according to a fifth embodiment.

FIG. 12 is a block diagram showing a fifth embodiment. In the following description, only points different from those of the first embodiment will be explained, and steps having the same functions as the functions of steps in FIG. 8 will be denoted by the same reference numerals, and redundant descriptions thereof will be omitted.

FIG. 12 includes a quality-inspection optical drive 301 as well as the optical drives 30 and other components included in FIG. 2. In the first embodiment, the quality inspection of an optical disc is performed by any of the optical drives 30 mounted on the optical disc library apparatus. In FIG. 12, all the quality inspections are performed by the quality-inspection optical drive 301. According to this embodiment, because all the quality inspections are performed by the same optical drive, variations among quality inspection values owing to differences among individual optical drives can be reduced.

In addition, there are components that greatly influence the reproduction capabilities of the optical drives 30 and the reproduction capability of the quality-inspection optical drive 301 such as an IV amplifier, therefore, by implementing more sophisticated components in the quality-inspection optical drive 301 as such components, it becomes possible to improve the reproduction capability of the quality-inspection optical drive 301 itself and to accurately inspect the quality of the optical discs.

Sixth Embodiment

FIG. 13 is a diagram schematically showing the recording region of an optical disc according to a sixth embodiment, and FIG. 10 is a flowchart showing the sixth embodiment. In the following description, only points different from those of the first embodiment will be explained, and steps having the same functions as the functions of steps in FIG. 8 will be denoted by the same reference numerals, and redundant descriptions thereof will be omitted.

FIG. 13 shows 5 regions that have respectively different recording conditions in predefined address spaces of an optical disc. FIG. 6 shows that there is a possibility that the preservation period of an optical disc varies in accordance with the recording condition of the optical disc. FIG. 6 is a diagram showing the result obtained by comparing two optical discs that have the same quality inspection values. In fact, even recording qualities based on the same parameters provide recording quality results different from each other in accordance with combinations of optical discs and optical drives, environmental temperatures and the like as well. The band configuration, in which respective bands have write powers different from each other, is obtained by taking the above variation causes taking into consideration, and is shown in FIG. 13. The inspection of qualities of all the optical discs mounted on the optical disc library apparatus can be realized by inspecting the quality of this only one optical disc with the above band configuration.

Figure 14:
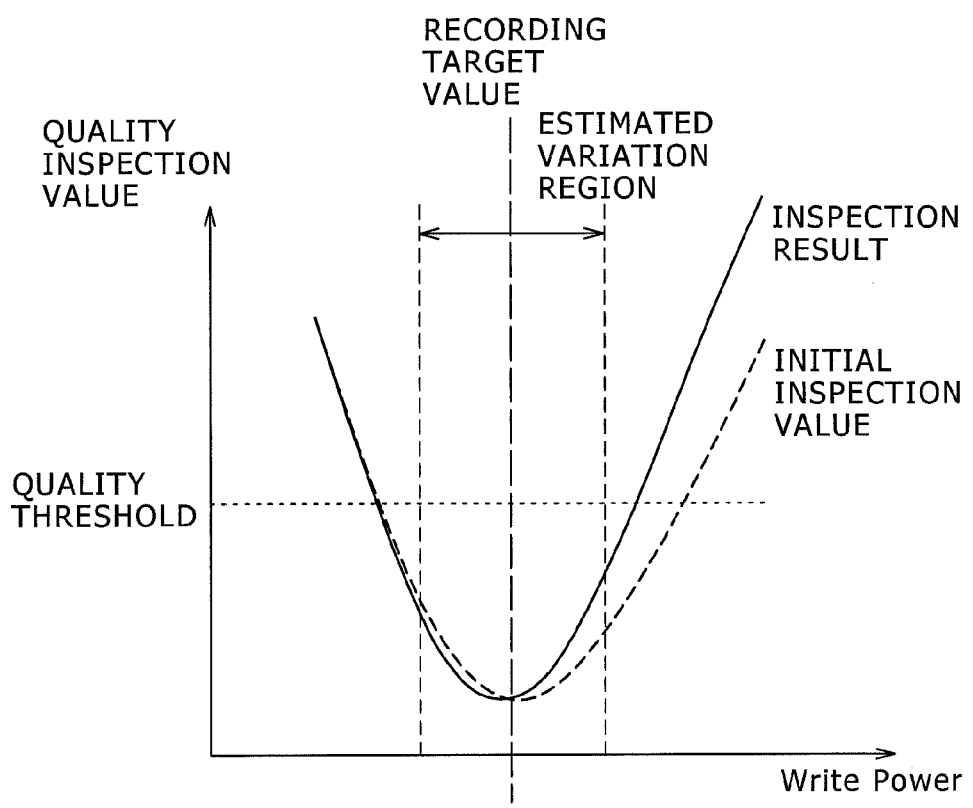
FIG. 14 is a diagram showing the relationship between write powers and recording qualities.

FIG. 14 is a diagram showing the relationship between write powers and the inspection results of aged recording qualities. The horizontal axis represents the write powers, which corresponds to write powers given by bands shown in FIG. 13. The vertical axis represents quality inspection values, and although it is desirable that the quality inspection values should be shown by error rates calculated with omitting burst errors that continuously occur, error rates that are generally calculated can be used as the quality inspection values. Judging from the result shown in FIG. 14, the quality degradation is more conspicuous in the recording state in which a higher write power is used. It is thinkable that the causes for the quality degradation are flaws and dust as well as aged degradation.

Figure 15:
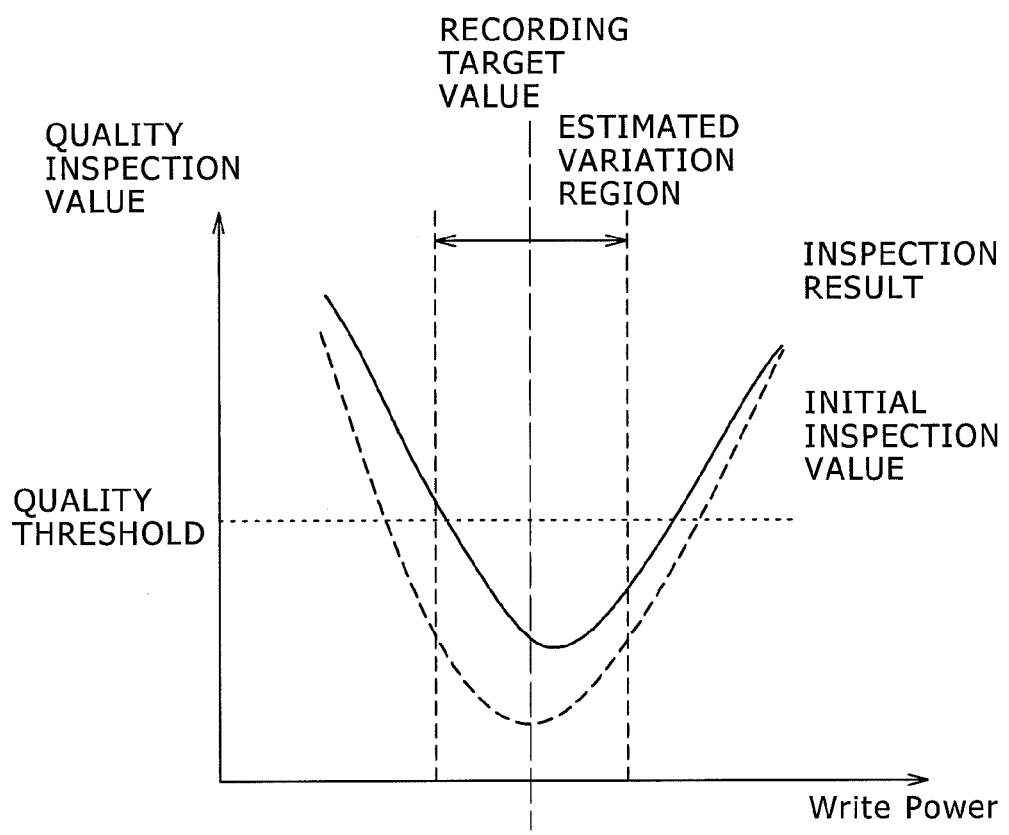
FIG. 15 is a diagram showing the relationship between write powers and recording qualities.

FIG. 15 is a diagram showing the relationship between write powers and the inspection results of aged recording qualities. However, the cause of the aged quality degradation in FIG. 15 is different from the cause of the aged quality degradation in FIG. 14. The cause in FIG. 14 is the aged degradation owing to the optical disc itself, and the causes in FIG. 15 are the flaws, dust, and the like. Judging from the above inspection results shown in FIG. 14 and FIG. 15, it is understandable that the status of the aged degradation of an optical disc varies in accordance with the cause of the aged degradation of the optical disc. By appropriately judging the status of the aged degradation, the causes of the aged degradation can be distinguished from each other.

Figure 16:
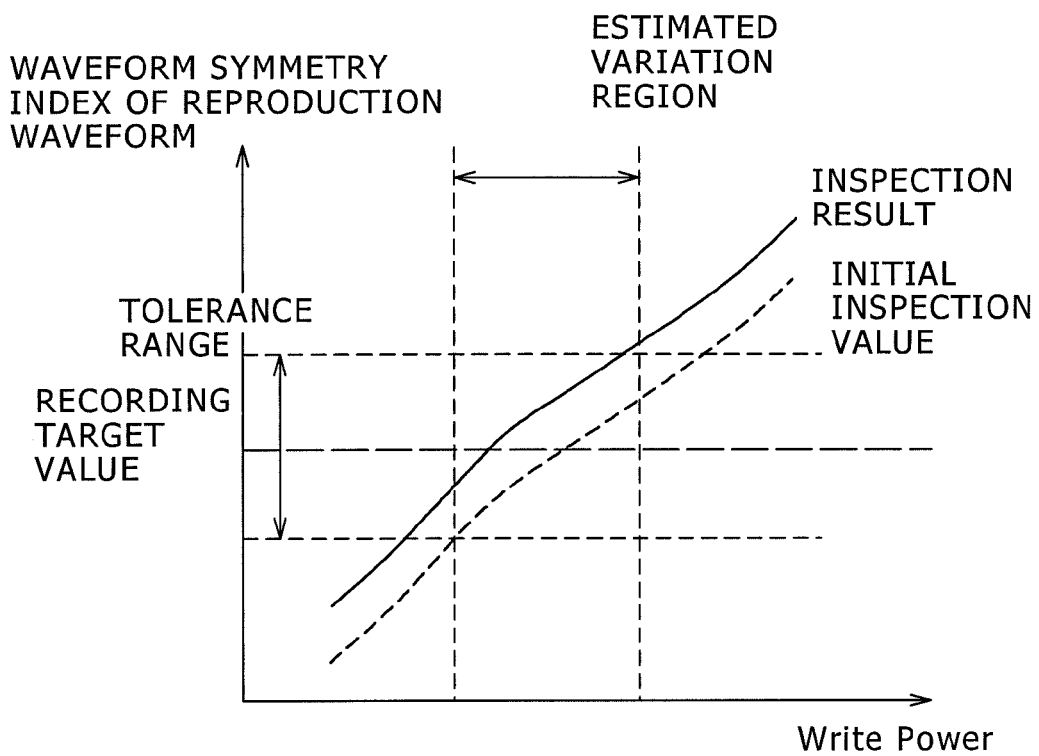
FIG. 16 is a diagram showing the relationship between write powers and the waveform symmetry indexes of a reproduction signal.

In addition, the causes of aged degradation can be distinguished with the use of the waveform symmetry index $\beta$ of a reproduction signal and the modulation M of signal amplitude that are the indirect indexes of the recording quality, or the like. FIG. 16 shows an inspection result in the case of using the waveform symmetry index $\beta$ of a reproduction signal as an index. The quality evaluation value that is influenced by the aged change is detected in the form of the initial inspection value being shifted. When the inspection result that exceeds the tolerance variation range is detected, degradation can be detected as is the case with the error ratio detection. However, because the waveform symmetry index $\beta$ of the reproduction signal is not the direct evaluation index of the recording quality, it is desirable to eventually make the above-mentioned error rate or the like a quality inspection index. In addition, if both error ratio or the number of errors and the reproduction waveform index $\beta$ or the modulation M of signal amplitude are used for reducing the deviation among reproduction results owing to differences among the reproduction capabilities of optical drives, the improvement in the accuracy of the inspection result of an optical disc can be expected.

On the basis of the above description, the sixth embodiment will be explained with reference to a flowchart in FIG. 10. First, the library control unit 11 instructs the changer mechanism 12 to feed an inspection optical disc to an optical drive 30. Here, the inspection optical disc is an optical disc including plural bands which have write powers the values of which are different from each other as shown in FIG. 13. The addresses of the band recording regions for inspection are not limited to the addresses shown in FIG. 13, and these band recording regions can be disposed to a specific disc for inspection or they can be disposed to all the optical discs. In addition, these band recording regions for inspection can be disposed to a user data region, and the data to be written can be a fixed data including a sequence of repeated data "00h". The addresses for the band recording regions for inspection are fixed, and original user data are written onto an optical disc with the addresses for the band recording regions masked.

After the changer mechanism 12 feeds the relevant optical disc 40 to the optical drive 30, the optical drive 30 loads the optical disc 40 and starts a recording quality inspection (at step S20). Although it is desirable that the recording quality should be shown by an error rate calculated with omitting the burst errors that continuously occur, an error rate that is generally calculated can be used as the recording quality, or the waveform symmetry index $\beta$ of a reproduction signal and the modulation M of signal amplitude that are the indirect indexes of the recording quality, or a jitter that is the fluctuation component of a binarized signal along the time axis can be used as the recording quality. Alternatively, it is conceivable that, while data used for the inspection are not modulated, patterns of a fixed data length are recorded (for example, patterns of a data length 6T is repeatedly recorded (T is a channel bit length)) and the jitters of the data are inspected. Alternatively, it is conceivable that patterns of a data length 6T are distinguished out of the recorded data based on a modulation scheme such as the above-mentioned sequence of repeated data "00h" or the like are used, and the jitters of the relevant data length patterns are extracted and inspected.

Figure 17:
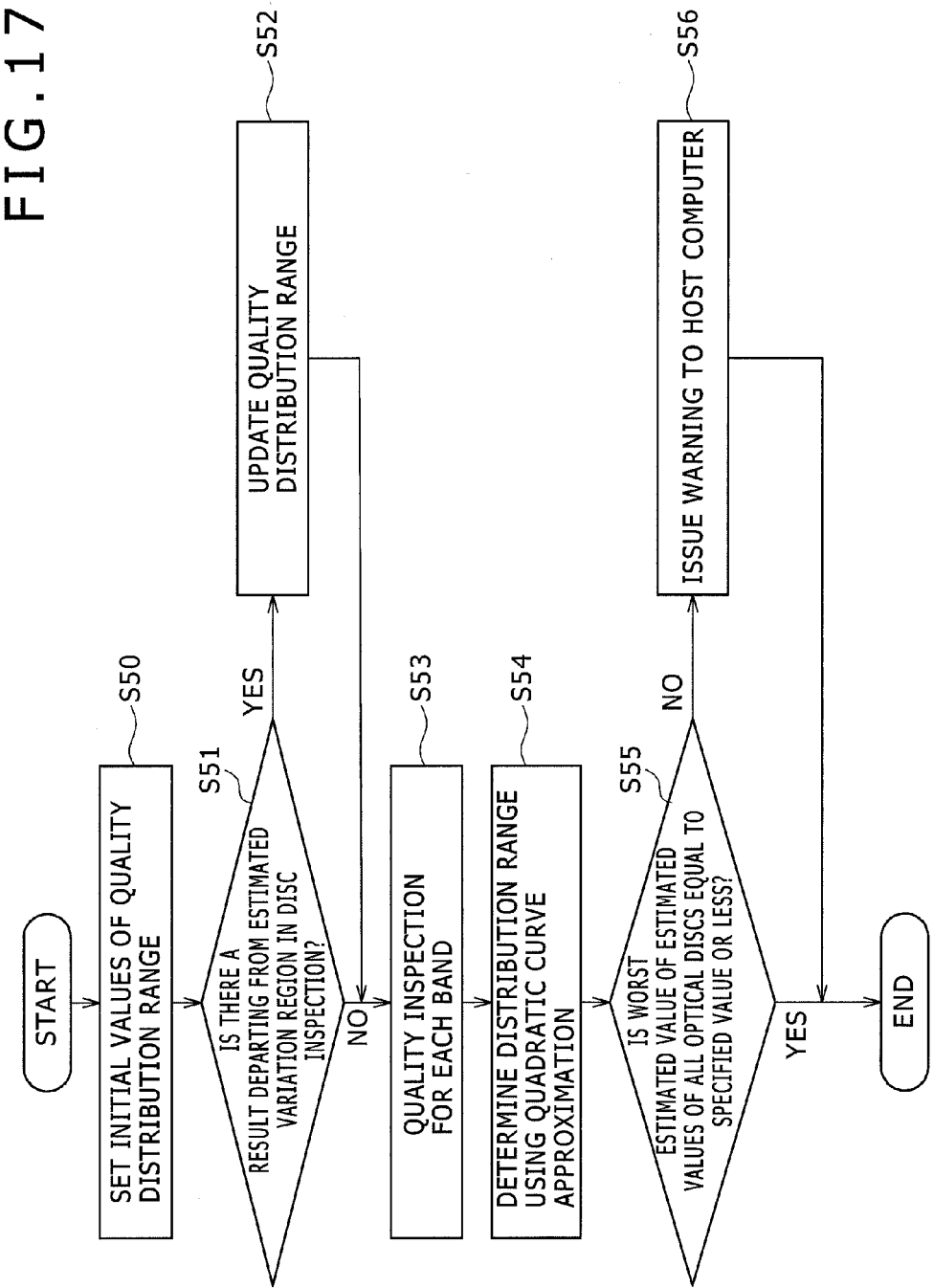
FIG. 17 is a flowchart for explaining an inspection method with the use of an inspection optical disc.
Figure 18:
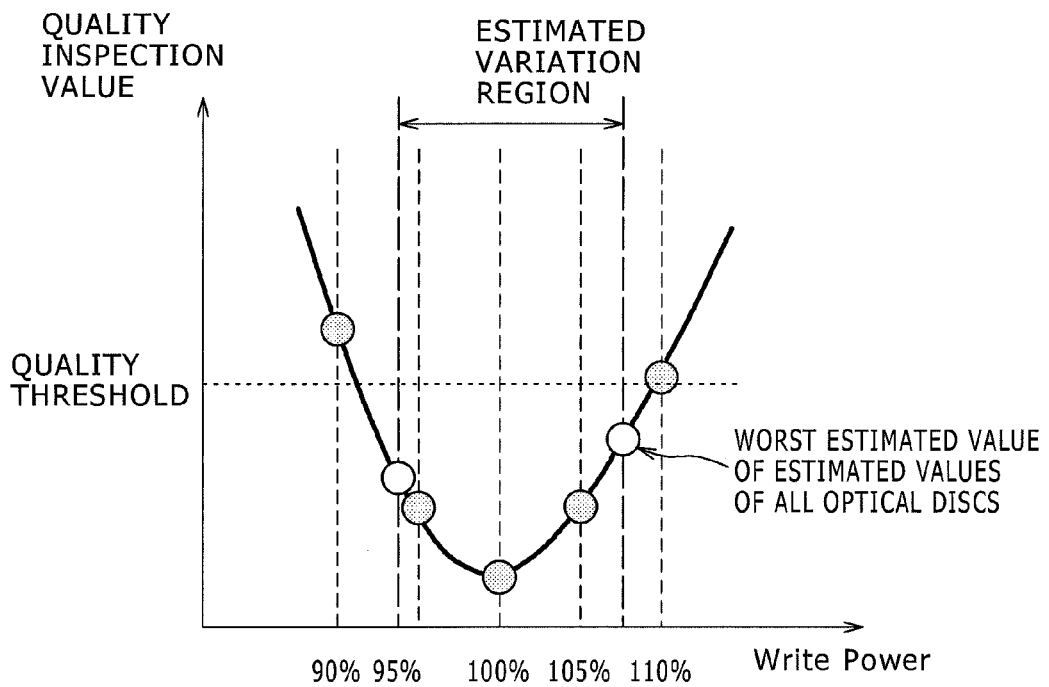
FIG. 18 is a diagram showing the relationship between write powers and quality inspection values.

Hereinafter, the inspection method with the use of the inspection optical disc will be explained with reference to FIG. 17 and FIG. 18. FIG. 17 is a flowchart for explaining the inspection method with the use of the inspection optical disc. In addition, FIG. 18 shows the write power of each band and the corresponding quality inspection value. First the library control unit 11 sets initial values of a quality distribution range in order to determine an estimated variation region shown in FIG. 18 (at step S50). Predefined fixed values can be used for the initial value setting of the quality distribution range, or the initial values of the quality distribution range can be set with reference to a table including IDs of optical discs and distribution ranges. Next, the library control unit 11 judges whether there is a result that departs from the estimated variation region shown in FIG. 18 or not with reference to the inspection results of optical discs that have been obtained so far (at step S51). If there is a result that exceeds the estimated variation region, it means that the quality distribution range of the optical discs mounted on the optical disc library apparatus exceeds the estimated variation region, so that the library control unit 11 updates the estimated variation region (at step S52). Successively, the flow proceeds to the quality inspection of the inspection optical disc.

The disc library apparatus 11 instructs the changer mechanism 12 to feed the inspection optical disc to an optical drive 30. After the changer mechanism 12 feeds the inspection optical disc to the optical drive 30, the optical drive 30 loads the inspection optical disc and starts a quality inspection of each band (at step S53). The result of this quality inspection is shown in FIG. 18. Quality inspection values vs. write power conditions are plotted, and the estimated quality distributions of all the optical discs mounted on the optical library apparatus are derived with the use of a quadratic curve approximation method (at step S54). Next, the intersection points of the estimated variation region and the graph depicted by the quadratic curve approximation method are obtained. In FIG. 18, because the approximating curve is a quadratic curve the horizontal coordinate of whose vertex is about 100 percent (write power), there are two intersection points. A larger quality inspection value of quality inspection values of the two intersection points is set to the worst estimated value of estimated values of all the optical discs, and whether the worst estimated value is equal to or smaller than the degradation detection threshold or not is judged (at step S55). If the worst estimated value is equal to or smaller than the degradation detection threshold, because it can be judged that the qualities of all the optical discs cause no troubles at the present moment, the optical disc inspection is finished. If the worst estimated value exceeds the degradation detection threshold, because it is thinkable that the quality of one or other optical disc mounted on the optical disc library apparatus has been degraded, the library control unit 11 issues a warning for requesting that the data of the optical disc mounted on the optical disc library apparatus should be rewritten to the host computer (at step S56).

In addition, the present invention is not limited to the above-described embodiments, and various modifications may be included in the present invention. For example, the above embodiments have been illustrated in detail for the sake of understandably describing the present invention, and there is no intention to limit the scope of the present invention to embodiments including all the configurations described above. In addition, in the above-described embodiments, a part of configuration of one embodiment may be replaced with a part of configuration of another embodiment, and a part of configuration of one embodiment may be added to the configuration of another embodiment.

In addition, a part of configuration of one embodiment may be deleted. In addition, a part or the entirety of configuration of each of the above-described configurations, functions, processing units, and processing means, and the like can be realized by hardware, or can be realized by programs executed by a processor. Alternatively, each of the above-described configurations, functions, and the like can be realized by software in such a way that a processor interprets and executes programs that realizes the above configurations, functions, and the like. Information of the programs, tables, files, and the like that are used for realize individual functions can be stored in storage devices such as a memory, a hard disc, and an SSD (solid state drive), or in recording media such as an IC card and an SD card.

In addition, control lines and information lines considered to be necessary for explanation are shown in the above-described embodiments, therefore it is not necessarily the case that all the control lines and information lines necessary for the optical disc library apparatus to operate as a product are shown. In reality, it is conceivable that all the configuration components shown in the above-described embodiments are coupled to each other.

What is claimed is:

1. An optical disc inspection method used for an optical disc library apparatus on which a plurality of optical discs and a plurality of optical drives are mounted, comprising:
    measuring a temperature inside the optical disc library apparatus;
    determining an inspection cycle for inspecting the optical discs on the basis of the measured temperature; and
    performing a recording quality inspection on optical discs on which data have already been recorded and that are stored in the optical disc library apparatus with the use of the optical drives on the basis of the determined inspection cycle, including
        performing the recording quality inspection on a first optical disc of the plurality of optical discs to determine a quality degradation of the first optical disc,
        performing the recording quality inspection on one or more other of the optical discs to determine a quality degradation of the one or more other discs of the plurality of optical discs, and
        comparing the quality degradation of the first optical disc and the quality degradation of the one or more other of the discs to determine whether the quality degradation of the first optical disc is due to an environmental condition in the optical disc library.

2. The optical disc inspection method according to claim 1, wherein, where a predefined recording quality is not satisfied when the recording quality inspection is performed on one of the optical discs, the method further comprises issuing, to a host computer, a warning that the data of the optical disc should be rewritten onto another optical disc.

3. The optical disc inspection method according to claim 1, wherein, where a predefined recording quality is satisfied when the recording quality inspection is performed on one of the optical discs, if a difference between the recording quality obtained in the inspection and the recording quality obtained in a past inspection performed on the optical disc by one of the optical drives exceeds a first threshold, the method further comprises issuing a predefined warning to a host computer.

4. The optical disc inspection method according to claim 1, wherein the optical discs on which data have already been recorded are all optical discs on which data have already been recorded and that are mounted on the optical disc library.

5. The optical disc inspection method according to claim 1, wherein the optical discs on which data have already been recorded include at least one optical disc extracted from the optical discs on which data have already been recorded and that are mounted on the optical disc library apparatus.

6. The optical disc inspection method according to claim 1, wherein a value of the measured temperature is an average value of temperatures that are measured through at least one day.

7. The optical disc inspection method according to claim 1, wherein a value of the measured temperature is an average value of temperatures that are measured at the same time slot of at least one day.

8. The optical disc inspection method according to claim 1, wherein the optical drives comprise optical drives configured to show better reproduction capabilities of the optical discs compared with reproduction capabilities of the optical discs shown by a user data recording/reproducing optical drive.

9. The optical disc inspection method according to claim 1, wherein each of the optical discs comprises an optical disc that includes a part of a user data area of at least one layer on which data with at least one error-correctable data length is recorded with a plurality of write powers.

10. The optical disc inspection method according to claim 1, wherein the quality degradation is represented by an error rate or a number of errors caused by a burst error.

11. The optical disc inspection method according to claim 10, wherein, if the burst error has at least a predefined data length, the method further comprises rewriting a data file including the burst error onto another optical disc.

12. The optical disc inspection method according to claim 10, wherein, if the burst error exceeds a first threshold, the method further comprises issuing a warning for requesting that the optical disc should be cleaned.

13. The optical disc inspection method according to claim 1, wherein the quality degradation is represented by a number of error corrections from a burst error owing to continuous physical defects, and an error rate or a number of errors is calculated omitting the burst error from one error correction block.

14. The optical disc inspection method according to claim 1, wherein a recording quality is represented as a waveform symmetry index of a reproduction signal, or a modulation showing a ratio of the signal amplitude to the signal level of an unrecorded signal, or a jitter that is the fluctuation component of a binarized signal along the time axis.

15. The optical disc inspection method according to claim 1, wherein, in the optical disc library apparatus, when the recording quality of one of the optical discs first obtained in the inspection performed by the one of the optical drives and the recording quality obtained after the recording quality inspection are compared with each other, if the difference between both quality degradations exceeds a first threshold, the method further comprises issuing a warning to a host computer for requesting that the data of the optical disc be rewritten onto another optical disk.

16. The optical disc inspection method according to claim 1, wherein, in the optical disc library apparatus, when the recording quality of one of the optical discs obtained at least in a last recording quality inspection performed by the one of the optical drives or before, and the quality degradation obtained after the inspection are compared with each other, if the difference between both quality degradations exceeds a first threshold, the method further comprises issuing a warning to a host computer for requesting that the data of the optical disc should be rewritten onto another optical disc.

17. The optical disc inspection method according to claim 1, wherein, in the optical disc library apparatus, when a first recording quality of one of the optical discs first obtained in a first inspection performed by one of the optical drives and a second recording quality obtained after the first inspection of the recording quality are compared with each other, if a difference between both recording qualities exceeds a first threshold, and when an average value of recording qualities obtained before the second recording quality inspection and the second recording quality are compared with each other, if the difference between the average value and the second recording quality exceeds a second threshold, the method further comprises issuing a warning to a host computer for requesting that the data of the optical disc should be rewritten onto another optical disc.

18. The optical disc inspection method according to claim 1, wherein, in the optical disc library apparatus, when a first recording quality of one of the optical discs obtained at least in a last recording quality inspection performed by one of the optical drives or before and a second recording quality obtained after a first recording quality inspection are compared with each other, if the difference between the first and second recording qualities exceeds a first threshold, and when an average value of recording qualities obtained before the second recording quality inspection and the second recording quality are compared with each other, if the difference between both recording qualities exceeds a second threshold, the method further comprises issuing a warning to a host computer for requesting that the data of the optical disc should be rewritten onto another optical disc.

19. The optical disc inspection method according to claim 1, wherein, in the optical disc library apparatus, when a first recording quality of one of the optical discs obtained in a first inspection performed by one of the optical drives and a second recording quality obtained after the first recording quality inspection are compared with each other, if the difference between the first and second recording qualities exceeds a first threshold, and when an average value of the recording qualities of a plurality optical discs obtained before the second recording quality inspection and the second recording quality of the optical disc are compared with each other, if the difference between both recording qualities exceeds a third threshold, the method further comprises issuing a warning for requesting that the data of the plurality optical discs should be rewritten onto other optical discs is issued to a host computer.

20. The optical disc inspection method according to claim 1, wherein, in the optical disc library apparatus, when a first recording quality of one of the optical discs obtained at least in a last recording quality inspection performed by one of the optical drives or before and a second recording quality obtained after a first recording quality inspection are compared with each other, if the difference between the first and second recording qualities exceeds a first threshold, and when an average value of the recording qualities of a plurality optical discs obtained before the second recording quality inspection and the second recording quality of the optical disc are compared with each other, if the difference between both the average value and the second recording quality exceeds a third threshold, the method further comprises issuing a warning to a host computer for requesting that the data of the plurality optical discs should be rewritten onto other optical discs.

21. An optical disc library apparatus for recording and reproducing information with the use of a plurality of optical discs, comprising:
   an optical disc storage unit configured to store the optical discs;
   a changer mechanism configured to feed the optical discs;
   optical drives configured to record/reproduce data on/from the optical discs;
   a thermometer configured to measure an environmental temperature; and
   a control unit configured to control the entire operation of the optical disc library apparatus so that the thermometer measures a temperature inside the optical disc library apparatus,
   wherein an inspection cycle for inspecting the optical discs is determined on the basis of the measured temperature, and
   wherein the optical drives are configured to perform the recording quality inspection on each of the optical discs on which data have already been recorded and that are stored in the optical disc library apparatus on the basis of the determined inspection cycle, including
      performing the recording quality inspection on a first optical disc of the plurality of optical discs to determine a quality degradation of the first optical disc,
      performing the recording quality inspection on one or more other of the optical discs to determine a quality degradation of the one or more other discs of the plurality of optical discs, and
      comparing the quality degradation of the first optical disc and the quality degradation of the one or more other of the discs to determine whether the quality degradation of the first optical disc is due to an environmental condition in the optical disc library.

22. The optical disc library apparatus according to claim 21,
   wherein, where a predefined recording quality is not satisfied when the recording quality inspection is performed on one of the optical discs, the control unit issues is configured to issue a warning that the data of the optical disc should be rewritten onto another optical disc to a host computer.

23. The optical disc library apparatus according to claim 21,
   wherein, where a predefined recording quality is satisfied when the recording quality inspection is performed on one of the optical discs, if a difference between the recording quality obtained in the inspection and the recording quality obtained in a previous inspection performed on the optical disc by one of the optical drives exceeds a first threshold, the control unit is configured to issue a predefined warning to a host computer.

24. The optical disc library apparatus according to claim 21,
   wherein, if a burst error, or a number of errors or an error rate calculated with omitting the burst error exceeds a first threshold when the recording quality inspection is performed on one of the optical discs, the method further comprises issuing a warning for requesting that the optical disc should be cleaned.

* * * * *